(12) United States Patent
Kim et al.

(10) Patent No.: US 12,463,957 B2
(45) Date of Patent: Nov. 4, 2025

(54) IOT DEVICE AND METHOD FOR ONBOARDING IOT DEVICE TO SERVER

(71) Applicant: SAMSUNG ELECTRONICS CO., LTD., Suwon-si (KR)

(72) Inventors: Eunchul Kim, Suwon-si (KR); Sanghee Kim, Suwon-si (KR); Sanghyuk Ko, Suwon-si (KR); Kanghee Lee, Suwon-si (KR); Seokhyun Kim, Suwon-si (KR); Jongwon Lee, Suwon-si (KR); Gajin Song, Suwon-si (KR); Sunkee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/350,996

(22) Filed: Jul. 12, 2023

(65) Prior Publication Data
US 2023/0353555 A1 Nov. 2, 2023

Related U.S. Application Data

(63) Continuation of application No. PCT/KR2021/018750, filed on Dec. 10, 2021.

(30) Foreign Application Priority Data

Jan. 13, 2021 (KR) .................. 10-2021-0004849

(51) Int. Cl.
*H04L 9/40* (2022.01)
*G16Y 30/10* (2020.01)
*H04L 41/0806* (2022.01)

(52) U.S. Cl.
CPC .......... *H04L 63/0823* (2013.01); *G16Y 30/10* (2020.01); *H04L 41/0806* (2013.01)

(58) Field of Classification Search
CPC ............. H04L 63/0823; H04L 41/0806; H04L 67/306; H04L 67/12; H04L 63/00;
(Continued)

(56) References Cited

U.S. PATENT DOCUMENTS 8,191,122 B2    5/2012   Schneider et al.
8,689,147 B2 *  4/2014   Griffin ................ G06F 3/04817
                                                       715/866
(Continued)

FOREIGN PATENT DOCUMENTS

CN        106919989 A  *  7/2017   ............. G06Q 10/02
CN        111698255 A  *  9/2020   ......... H04L 63/0876
(Continued)

OTHER PUBLICATIONS

International Search Report for PCT/KR2021/018750, mailed Mar. 15, 2022, 3 pages.
(Continued)

*Primary Examiner* — Zi Ye
*Assistant Examiner* — Mariegeorges A Henry
(74) *Attorney, Agent, or Firm* — Nixon & Vanderhye, P.C.

(57) ABSTRACT

An electronic device according to various embodiments may comprise: a communication module comprising communication circuitry, a memory, and a processor operatively connected to the communication module and the memory, wherein the processor is configured to: execute an application supporting onboarding of the electronic device; obtain authentication information of the electronic device; transmit the authentication information to a cloud network through the communication module to register the authentication information of the electronic device; generate configuration information of the electronic device based on an input on the application; and transmit the generated configuration infor-
(Continued)

mation and device information of the electronic device stored in the memory to the cloud network through the communication module to request onboarding of the electronic device.

18 Claims, 17 Drawing Sheets

(58) Field of Classification Search
CPC ..... H04L 67/34; H04L 67/56; H04L 63/0876; H04L 63/10; H04L 67/562; G16Y 30/10; G06F 21/44
USPC ......................................................... 709/222
See application file for complete search history.

(56) References Cited

U.S. PATENT DOCUMENTS

| | | | |
|---|---|---|---|
| 9,686,094 | B2 | 6/2017 | Kim et al. |
| 9,935,962 | B2 | 4/2018 | Burns et al. |
| 9,936,155 | B2* | 4/2018 | Lee ................ H04N 21/658 |
| 10,057,243 | B1 | 8/2018 | Kumar et al. |
| 10,349,268 | B1 | 7/2019 | Serrano et al. |
| 11,337,070 | B2 | 5/2022 | Heldt-Sheller et al. |
| 2005/0125677 | A1* | 6/2005 | Michaelides ........... H04L 63/08 713/185 |
| 2011/0161659 | A1 | 6/2011 | Himawan et al. |
| 2014/0068237 | A1* | 3/2014 | Irwin ................ G16H 40/67 713/1 |
| 2015/0121470 | A1 | 4/2015 | Rongo et al. |
| 2015/0222621 | A1 | 8/2015 | Baum et al. |
| 2017/0006471 | A1 | 1/2017 | Kim et al. |
| 2017/0215021 | A1* | 7/2017 | de Azevedo .......... H04W 24/10 |
| 2018/0109650 | A1 | 4/2018 | Berdy et al. |
| 2018/0159855 | A1* | 6/2018 | Ha ..................... H04W 12/068 |
| 2018/0309828 | A1* | 10/2018 | Ghabour ............ H04N 1/00517 |
| 2019/0239068 | A1 | 8/2019 | Mudulodu et al. |
| 2019/0306242 | A1* | 10/2019 | Thummalapalli ... H04L 41/0806 |
| 2020/0153697 | A1 | 5/2020 | Turner et al. |
| 2020/0329032 | A1 | 10/2020 | Vohra et al. |
| 2020/0364177 | A1* | 11/2020 | Lee ..................... H04B 1/3816 |
| 2021/0176638 | A1 | 6/2021 | Heldt-Sheller et al. |

FOREIGN PATENT DOCUMENTS

| | | |
|---|---|---|
| JP | 2018067043 A | 4/2018 |
| KR | 20150073827 A | 7/2015 |
| KR | 20180103892 A | 9/2018 |
| KR | 20200097744 A | 8/2020 |
| KR | 102213640 B1 | 2/2021 |
| WO | 2015061678 A1 | 4/2015 |
| WO | 2018236421 A1 | 12/2018 |

OTHER PUBLICATIONS

Written Opinion of the ISA for PCT/KR2021/018750, mailed Mar. 15, 2022, 5 pages.
Extended Search Report dated May 3, 2024 in European Patent Application No. 21919896.7.

* cited by examiner

IOT DEVICE AND METHOD FOR ONBOARDING IOT DEVICE TO SERVER

CROSS-REFERENCE TO RELATED APPLICATIONS

This application is a continuation of International Application No. PCT/KR2021/018750 designating the United States, filed on Dec. 10, 2021, in the Korean Intellectual Property Receiving Office and claiming priority to Korean Patent Application No. 10-2021-004849, filed on Jan. 13, 2021, in the Korean Intellectual Property Office, the disclosures of which are incorporated by reference herein in their entireties.

BACKGROUND

Field

The disclosure relates to the Internet of things (IoT) and, for example, relate to a method for onboarding an IoT device into a cloud server.

Description of Related Art

Cloud computing technology refers to a technology for providing a user with a computing resource existing at a different location from the user through a network, thereby providing a computing service such as a server, a depository, software, or analysis. Cloud computing is utilized to process data generated by the Internet of Things (hereinafter, referred to as IoT). A user's data or contents collected by an IoT device may be stored in a cloud server, and a cloud service may be provided to the user through data processing.

In order to use an IoT device in an IoT environment, an onboarding process for registering the IoT device in a cloud server is needed. In order to onboard an IoT device, authentication information by which the IoT device can be authenticated, uniform resource locator (URL) information necessary to access the cloud server, and/or device information such as the device type, profile, or location information of the IoT device may be necessary.

In order to onboard an IoT device into a cloud server in a conventional IoT environment, the manufacturer may register authentication information and device information through an interface provided by the cloud server during a manufacturing process. In addition, the user of the IoT device may receive pieces of information necessary for onboarding from the cloud server using a user device (for example, a smartphone or a tablet PC), may connect the IoT device and the user device through short-range wireless communication (for example, Wi-Fi), and may transmit information received from the cloud server to the IoT device. Such an IoT device onboarding process may cause a stability problem in that the user device needs to release the short-range wireless communication already connected to the devices, and the probability of onboarding failure increases.

SUMMARY

Embodiments of the disclosure may provide a method for enabling an IoT device to onboard itself into a cloud server without registering device information during a manufacturing process and/or connecting the IoT device to a user device.

An electronic device according to various example embodiments may include: a communication module comprising communication circuitry, a memory, and a processor operatively connected to the communication module and the memory, and the processor may be configured to: execute an application supporting onboarding of the electronic device, acquire authentication information of the electronic device, transmit the authentication information to a cloud network through the communication module to register authentication information of the electronic device, generate configuration information of the electronic device based on an input on the application, and transmit the generated configuration information and device information of the electronic device stored in the memory to the cloud network through the communication module to request onboarding of the electronic device.

A method for onboarding an electronic device into a server according to various example embodiments may include: executing an application supporting onboarding of the electronic device, acquiring authentication information of the electronic device, transmitting the authentication information to a cloud network to register authentication information of the electronic device, generating configuration information of the electronic device based on an input on the application, and requesting onboarding of the electronic device by transmitting the generated configuration information and device information of the electronic device to the cloud network.

Various example embodiments of the disclosure may provide an IoT device capable of onboard itself into a cloud server without registering device information during a manufacturing process and/or connecting the IoT device to a user device, and a method for onboarding an IoT device into a server.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
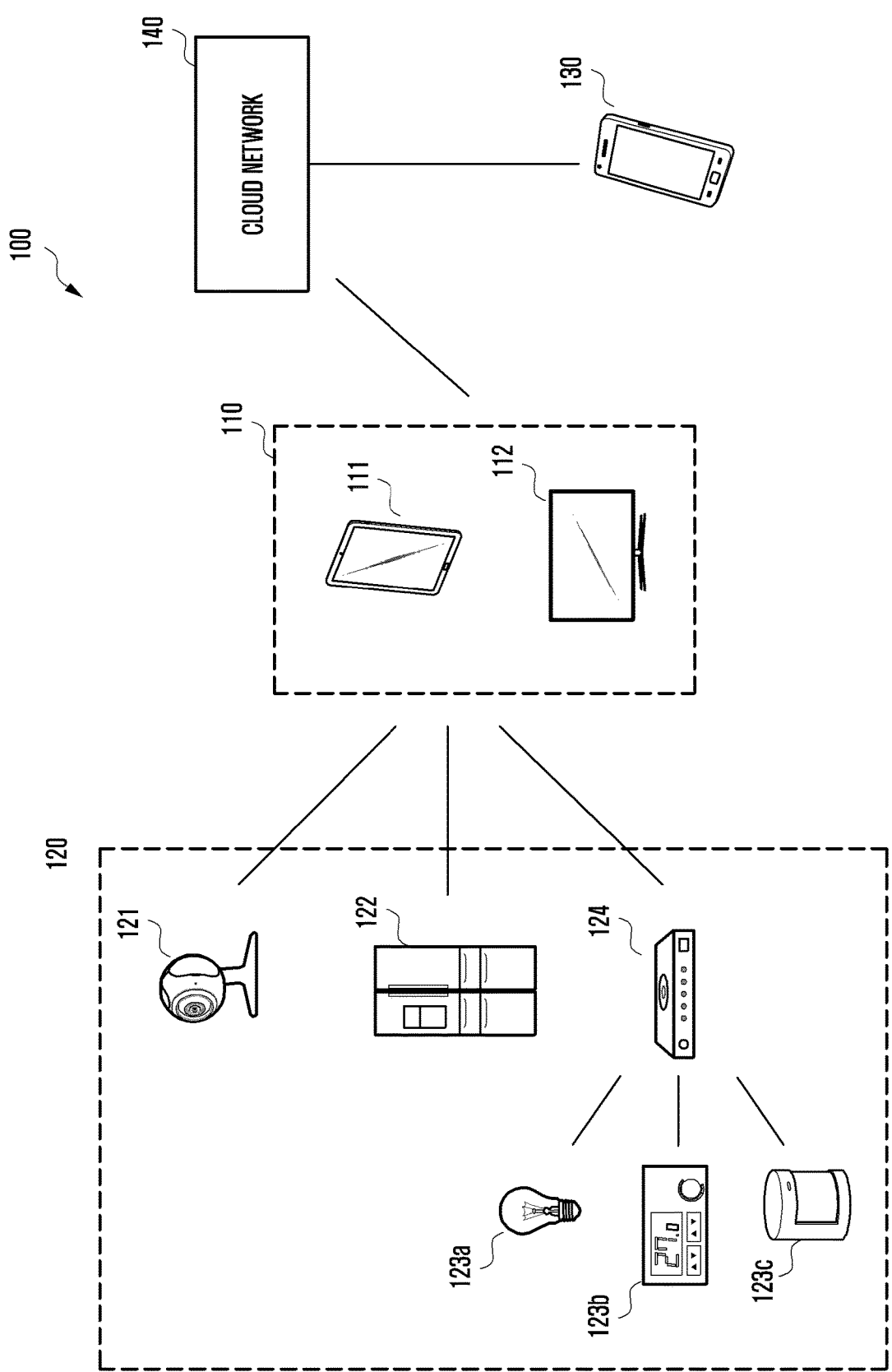
FIG. 1 is a diagram illustrating devices in an IoT environment according to various embodiments.

FIG. 1 is a diagram illustrating devices in an IoT environment (or IoT system) according to various embodiments.

Referring to FIG. 1, the Internet of thing (IoT) system 100 may include at least one leaf device 120, at least one hub device (or edge device) 110, a user device 130, and a cloud network 140. For example, the leaf device 120, the hub device 110, and the user device 130 may be disposed at adjacent locations (for example, inside a house) and connected to an identical home network (for example, identical access point (AP)), and the cloud network 140 may be located remotely and connected to the leaf device 120, the hub device 110, and the user device 130 through the Internet. In the disclosure, the hub device 110 and the leaf device 120 of the IoT system 100 may also be referred to as IoT devices, respectively.

In various embodiments of the disclosure, a cloud computing service may be provided using each device of the IoT system. For example, when a motion is sensed by a motion sensor 123c, corresponding sensing data may be provided to the cloud network 140, and the cloud network 140 may identify an operation mapped to an event of the motion sensor 123c and may transmit a command for turning a lightbulb 123a on.

In addition, in various embodiments of the disclosure, an edge computing service may be provided using each device of the IoT system. The edge computing service may refer to a technology for transmitting data acquired by a leaf device to a hub device located adjacent to the leaf device and located in an identical home network, and then providing a series of data processing and other services using the hub device. In various embodiments of the disclosure, a device (for example, a camera 121, a refrigerator 122, a lightbulb 123a, a digital thermometer 123b, or a motion sensor 123c) configured to acquire data through a sensor is referred to as a leaf device, but the leaf device may be referred to by another name, such as a client device, an end device, a sensor device, an IoT device, or a slave device of the edge computing service. In addition, a hub device of various embodiments of the disclosure may be referred to by another name, such as an edge device, an edge server, a server device, a master device, or a service device of the edge computing service.

Although respective devices in the IoT system 100 are classified and described as a leaf device 120, a hub device 110, and a user terminal 130 according to functions or operations, an identical device (for example, a smartphone or a tablet PC) may operate as one of the leaf device 120, the hub device 110, and the user terminal 130 in some cases. In other words, the name and/or definition of a device described in various embodiments of the disclosure do not limit the function and/or operation of the device.

According to various embodiments, the leaf device 120 may collect various pieces of data using a sensor, as an end point of the IoT system 100, and may transmit the collected data to the hub device 110 or the cloud network 140. In addition, the leaf device 120 may perform various operations according to a command transferred from the cloud network 140, the hub device 110, or the user device 130. Referring to FIG. 1, a device such as a camera 121, a refrigerator 122, a lightbulb 123a, a digital thermometer 123b, or a motion sensor 123c may become a leaf device 120.

According to various embodiments, at least some of the leaf device 120 (for example, the camera 121 and the refrigerator 122) may access the cloud network 140 through the Internet, and a device (for example, the lightbulb 123a, the digital thermometer 123b, or the motion sensor 123c) that does not support the Internet protocol (IP) among the leaf device 120 may transmit sensing data to a repeater 124 through non-IP-based communication (for example, Bluetooth of Zigbee) supported thereby, and the repeater 124 may transmit sensing data from each leaf device 124a, 123b, and 123c to the cloud network 140 through the Internet.

According to various embodiments, data acquired by the leaf device 120 may be processed by a cloud computing service or an edge computing service. For example, image data acquired by the camera 121 which is a leaf device may be transmitted to the cloud network, a command for on/off control of the lightbulb 123a may be transmitted from the cloud network, and/or the image data may be provided to the user device 130 in real time. Image data acquired by the camera 121 may be transmitted to the hub device 110, and a command for on/off control of the lightbulb 123a and the image data may be transmitted from the hub device 110.

According to various embodiments, the cloud network 140 may include various server devices (for example, an IoT management server and an IoT hub server) located in the network and configured to support the cloud computing service in the IoT system 100. The cloud network 140 may perform computing processing regarding sensing data received from the leaf device 120 and may transmit a command for controlling the leaf device 120.

According to various embodiments, the cloud network 140 may perform a function of operating and managing a specific device in a home network to be able to operate as a hub device 110. For example, the cloud network 140 may include an IoT server (for example, an IoT management server or an IoT hub server), and the IoT server may perform an edge computing service such as registering, connecting, or managing the hub device 110 and the leaf device 120, and may provide the hub device 110 with a module (for example, a device module and/or a service module) necessary for the edge computing service.

According to various embodiments, the hub device 110 may directly process data received from the leaf device 120 or transmit the same to the cloud network 140 (for example, IoT server). The hub device 110 may include hardware and/or software resources necessary for the edge computing service, such as a TV 112 or a tablet PC 111. The hub device 110 may be connected to the cloud network 140 through the Internet, and may communicate with the leaf device 120 through direct communication, a mesh network, or an access point.

According to various embodiments, multiple hub devices 110 may exist in the home network, and the leaf device 120 may be connected to one of the multiple hub devices 110 and transmit data. For example, when a specific leaf device 120 is connected, the hub device 110 may download a module (for example, a device module and/or a service module) necessary for the edge computing service from the cloud network 140 and may execute the same.

According to various embodiments, the hub device 110 may perform a function (for example, TV image output function) unique to the device, and may perform an edge computing service through hardware and/or software resources at least partially concurrently with performing the unique function or during an idle time during which the unique function is not performed.

According to various embodiments, the hub device 110 may store rule information including pieces of information for event automated processing. For example, the rule information may be a rule that maps an operation command indicating an operation to be performed by another leaf device, in response to a trigger event occurring in a specific leaf device. The hub device 110 may receive rule information from the cloud network 140 and may construct a database in the memory of the hub device 110.

According to various embodiments, the user device 130 may provide various user interfaces related to the edge computing service through an application. For example, the user device 130 may display data (for example, camera video streaming) acquired by the leaf device 120 or result data (for example, human recognition) obtained by processing the data by the hub device 110 or the cloud network 140, on a display. In addition, the user device 130 may receive a user input regarding connection of the hub device 110 and/or the leaf device 120 or server registration thereof, and may transmit the same to the cloud network 140.

Figure 2A:
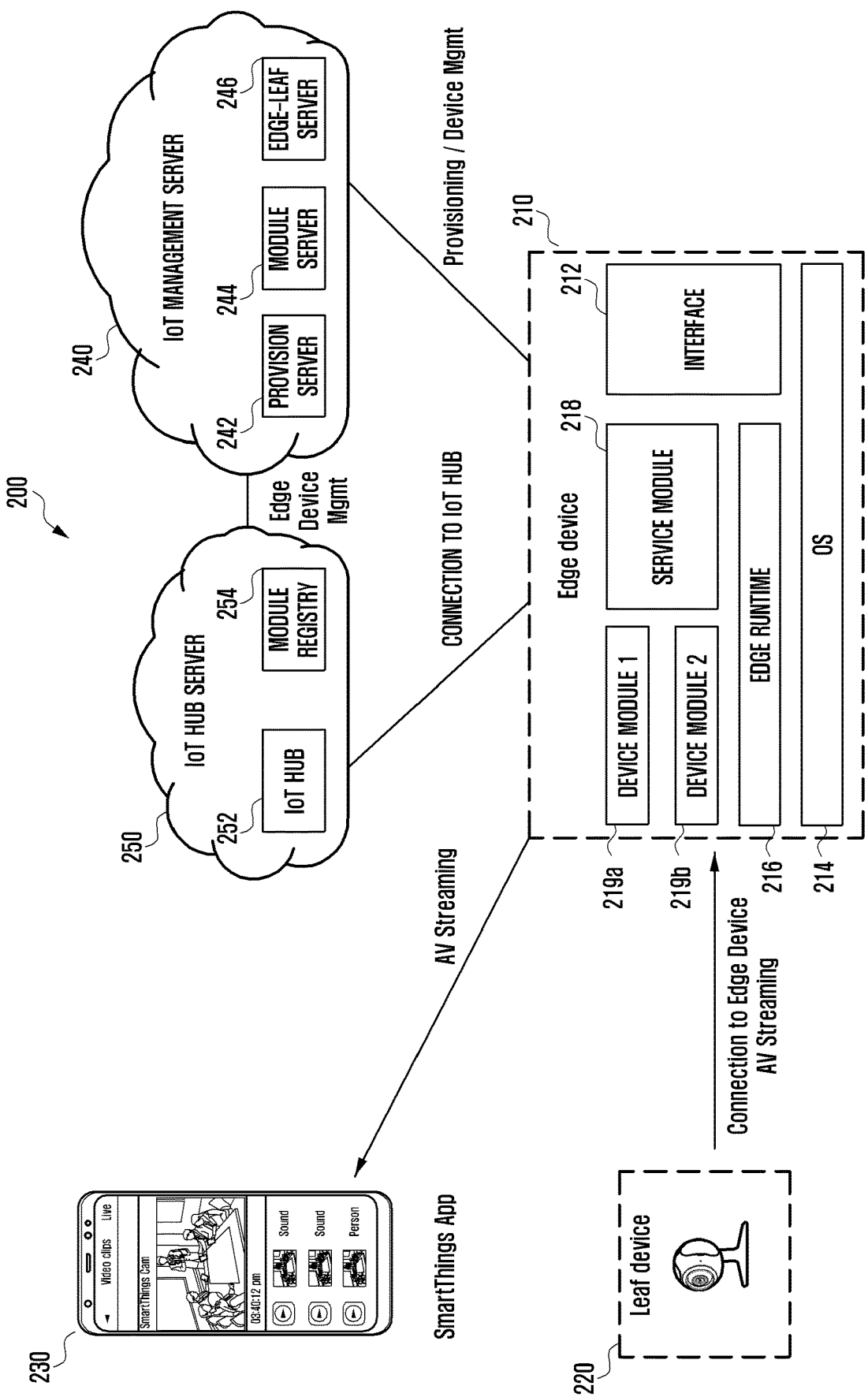
FIG. 2A and FIG. 2B are diagrams illustrating respective devices of an IoT system according to various embodiments.
Figure 2B:
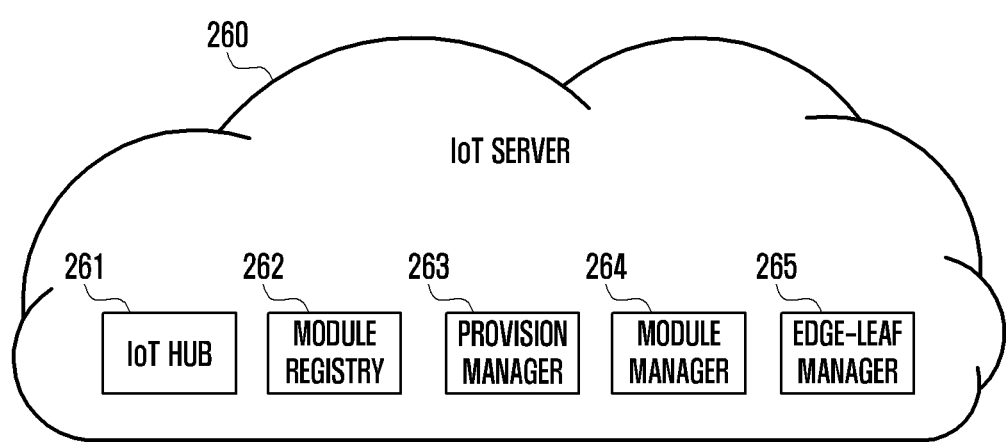

FIG. 2A and FIG. 2B are diagrams illustrating respective devices of an IoT system according to various embodiments.

Referring to FIG. 2A, the IoT system (or cloud computing system or an edge computing system) 200 may include a leaf device 220, a hub device 210, a user device 230, an IoT hub server 250, and an IoT management server 240. As described with reference to FIG. 1, various IoT devices may exist in a home network, and one leaf device 220 (for example, the camera 121 in FIG. 1) and one hub device 210 (for example, the TV 112 in FIG. 1) will be described for example with reference to FIG. 2.

According to various embodiments, the IoT management server 240 (for example, SmartThings™ server) may be a server device configured to provide various services for determination, connection, and/or operation of an edge computing service, and may include a provision manager 242, a module manager 244, and an edge-leaf manager 246. Each of the modules and/or managers described herein may include various processing circuitry and/or executable program instructions.

According to various embodiments, the provision manager 242 may perform a relay function such that the hub device 210 is connected to the IoT hub server 250. For example, when the hub device 210 is initially registered in the IoT management server 240, the provision manager 242 may transmit a connection string to the hub device 210 such that the hub device 210 can be connected to the IoT hub server 250.

According to various embodiments, the module manager 244 may manage pieces of information regarding various modules provided for the edge computing service and devices supporting respective services. For example, modules necessary to perform the edge computing service may include device modules 219a and 219b configured to enable the hub device 210 to transmit data transmitted from the leaf device 220 to an external server (for example, the IoT hub server 250), and a service module 218 including programs executed to implement a service in the hub device 210, based on data transmitted by the leaf device 220.

According to various embodiments, the edge-leaf manager 246 may manage the state of connection between a hub device 210 and a leaf device 220 existing in various home networks. For example, when a hub device 210 and a leaf device 220, which are registered in the IoT management server 240, are connected to or disconnected from each other, the hub device 210 and/or the leaf device 220 may transmit connection or disconnection information to the IoT management server 240, and the IoT management server 240 may store information regarding what hub device 210 and leaf device 220 are connected, or what service is being performed, in real time.

According to various embodiments, assuming that the leaf device 220 connects to a specific edge device (for example, the tablet PC 111 in FIG. 1), performs an edge computing service, disconnects from the edge device according to a handover event, connects to another edge device (for example, the TV 112 in FIG. 1), and performs an edge computing service, the IoT management server 240 may update information regarding the connection between the hub device 210 and the leaf device 220 changed by the handover event.

According to various embodiments, the IoT hub server 250 may support a cloud computing platform, and may provide data necessary to interconnect a leaf device 220 and a hub device 210 in a cloud environment. The IoT hub server 250 may include an IoT hub 252 and a module registry 254.

According to various embodiments, the module registry 254 may be a depository of modules (for example, a device module 219, a service module 218) necessary to perform an edge computing service.

According to various embodiments, the IoT hub 252 may maintain connection to a hub device 210, may provide the hub device 210 with a module stored in the module registry 254, and may maintain information of modules installed in multiple hub devices 210.

According to various embodiments, the hub device 210 (for example, the edge device 110 in FIG. 1) may have a function unique to the device, such as a TV, a tablet PC, or a laptop PC, and may include hardware and/or software components (for example, an edge runtime and/or a default module) for an edge computing service. The edge computing service may be performed through hardware and/or software resources at least partially concurrently with performing the unique function or during an idle time during which the unique function is not performed.

According to various embodiments, the hub device 210 may include an interface (e.g., including circuitry) 212 for communicating with a cloud (for example, an IoT management server 240 or an IoT hub server 250), an operating system (OS) 214, an edge runtime 216, a service module 218, and a device module 219. For example, the hub device 210 may include a hardware condition (for example, CPU performance) for operating the OS 214, and may be configured as a real-time operating system (RTOS).

An edge runtime 216 and a default module for edge computing may be installed in the hub device 210 through software upgrade or process procedure of the hub device 210. For example, the edge runtime 216 may include a daemon program for interworking with an IoT server, and the default module may be configured as a container which is a program necessary for communication with the IoT server. For example, the default module may be a container installed in the edge runtime 216 environment.

According to various embodiments, when connected to a specific leaf device 220, the hub device 210 may receive at least one module for performing an edge computing service from the IoT hub server 250 and install the same. For example, the at least one module may be determined according to the type of the leaf device 220 and/or the type of a service that can be performed, and may include a device module 219 corresponding to the leaf device 220 and/or a service module 218 corresponding to the type of the service to be performed. When the hub device 210 is connected to multiple leaf devices 220, devices modules 219 (for example, a first device module 219a and a second device module 219b) corresponding to respective leaf devices 220 may be installed. The hub device 210 may execute the edge runtime 216 during a provision process to be connected to the IoT hub server 250, and may additionally install and execute the at least one module according to the type of the leaf device 220. The hub device 210 may activate or deactivate the edge mode according to a command received from the IoT hub server 250 or the IoT management server 240. When the edge mode is deactivated, the hub device 210 may perform only a unique function (for example, TV image output function), and may not execute the device module 219 and the service module 218.

According to various embodiments, the leaf device 220 (for example, the leaf device 120 in FIG. 1) may transmit data acquired using a sensor to a hub device 210 or a cloud network (for example, an IoT management server 240 and/or an IoT hub server 250) connected thereto. For example, an Internet protocol (IP) camera operating as a leaf device 220 may connect to the hub device 210 and transmit a video stream to the hub device 210.

According to various embodiments, the user device 230 may be a device, such as a smartphone or a tablet PC, which is capable of executing various applications, and which includes a display capable of displaying a user interface (UI). The user device 230 may install and/or execute an application for an edge computing service, and may receive contents and notifications generated by the leaf device 220 through the application. When the hub device 210 and the leaf device 220 are connected, contents or notifications generated by the leaf device 220 may be transmitted to the user device 230 through the hub device 210.

According to various embodiments, functions of the IoT hub server 250 and the IoT management server 240 may be performed by one server device (for example, the IoT server 260 in FIG. 2B). For example, referring to FIG. 2B, the IoT server 260 may include an IoT hub 261 (for example, the IoT 252 in FIG. 2A), a module registry 262 (for example, the module registry 254 in FIG. 2A), a provision manager 263 (for example, the provision manager 242 in FIG. 2A), a module manager 264 (for example, the module manager 244 in FIG. 2A), and an edge-leaf manager 265 (for example, the edge-leaf manager 246 in FIG. 2A), which correspond to above-described components of the IoT hub server 250 and the IoT management server 240.

Alternatively, the above functions may be performed by multiple (three or more) server devices. For example, respective components of the IoT hub server 250 and the IoT management server 240 in FIG. 2A may be disposed in a distributed manner by multiple (three or more) server devices, and some operations performed by respective components may be performed in a distributed manner by multiple server devices.

Figure 3:
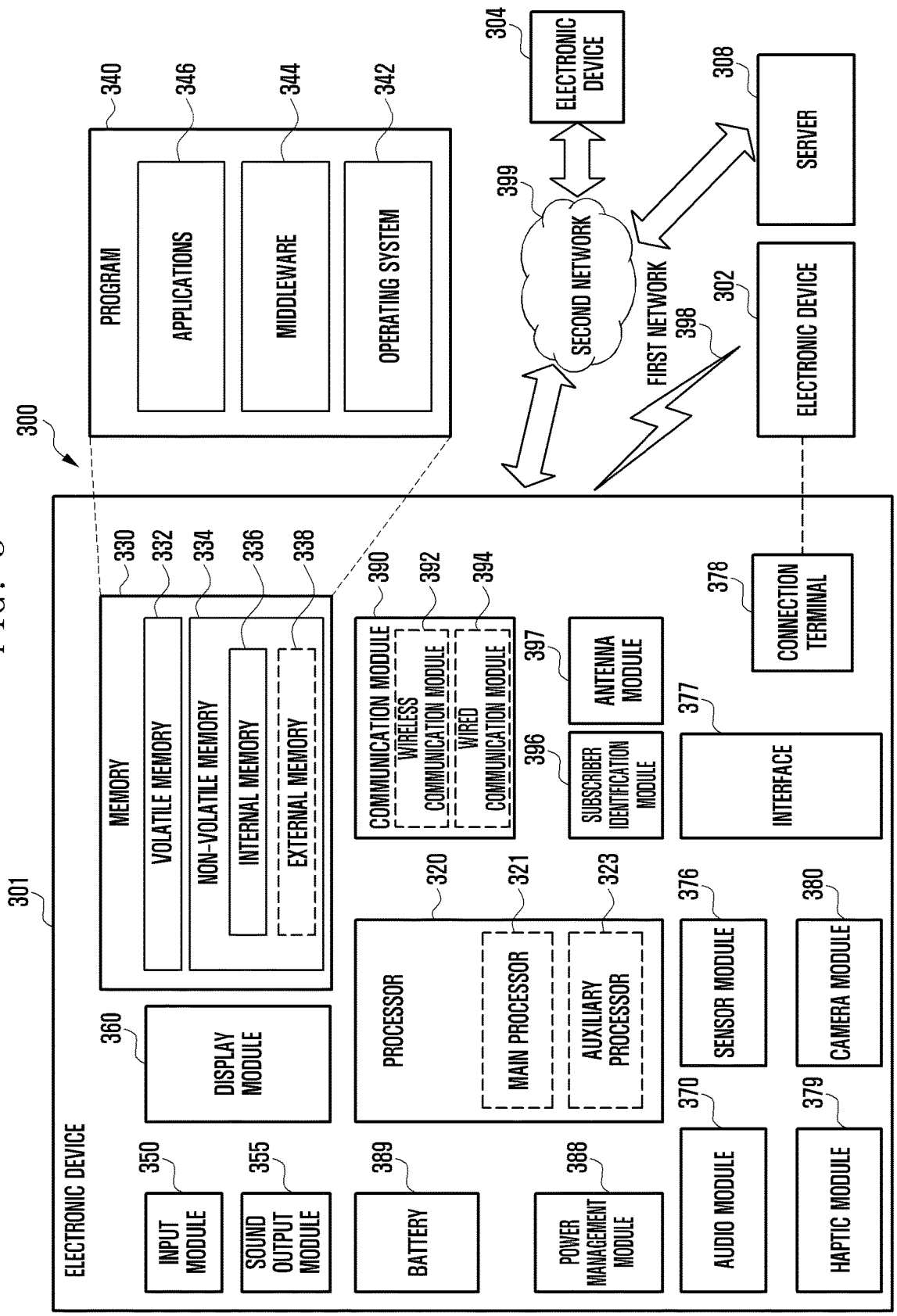
FIG. 3 is a block diagram illustrating an example IoT device and/or a user device in a network environment according to various embodiments.

FIG. 3 is a block diagram illustrating an example IoT device and/or a user device in a network environment according to various embodiments.

As described above, an identical device may operate as an IoT device (for example, the hub device 110 or the leaf device 120 in FIG. 1) in an IoT system (for example, the IoT system 100 in FIG. 1), and may operate as a user device (for example, the user device 130 in FIG. 1). Hereinafter, components and/or functions of an electronic device 301 which may operate as an IoT device and/or a user device will be described in detail with reference to FIG. 3.

FIG. 3 is a block diagram illustrating an example electronic device 301 in a network environment 300 according to various embodiments. Referring to FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input device 350, a sound output device 355, a display module 360, an audio module 370, a sensor module 376, an interface 377, a haptic module 379, a camera module 380, a power management module 388, a battery 389, a communication module 390, a subscriber identification module (SIM) 396, or an antenna module 397. In various embodiments, at least one (e.g., the display module 360 or the camera module 380) of the components may be omitted from the electronic device 301, or one or more other components may be added in the electronic device 301. In various embodiments, some of the components may be implemented as single integrated circuitry. For example, the sensor module 376 (e.g., a fingerprint sensor, an iris sensor, or an illuminance sensor) may be implemented as embedded in the display module 360 (e.g., a display).

The processor 320 may execute, for example, software (e.g., a program 340) to control at least one other component (e.g., a hardware or software component) of the electronic device 301 coupled with the processor 320, and may perform various data processing or computation. According to an embodiment, as at least part of the data processing or computation, the processor 320 may load a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display module 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input module 350 may receive a command or data to be used by other component (e.g., the processor 320) of the electronic device 301, from the outside (e.g., a user) of the electronic device 301. The input module 350 may include, for example, a microphone, a mouse, or a keyboard.

The sound output module 355 may output sound signals to the outside of the electronic device 301. The sound output module 355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display module 360 may visually provide information to the outside (e.g., a user) of the electronic device 301. The display module 360 may include, for example, a display, a hologram device, or a projector and control circuitry to control a corresponding one of the display, hologram device, and projector. According to an embodiment, the display module 360 may include touch circuitry adapted to detect a touch, or sensor circuitry (e.g., a pressure sensor) adapted to measure the intensity of force incurred by the touch.

The audio module 370 may convert a sound into an electrical signal and vice versa. According to an embodiment, the audio module 370 may obtain the sound via the input module 350, or output the sound via the sound output module 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector), The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to an embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™ wireless-fidelity (Wi-Fi) direct, or infrared data association (IrDA)) or the second network 399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The wireless communication module 392 may support 5G networks after 4G networks and next-generation communication technologies, for example, new radio (NR) access technology. The NR access technology may support high-speed transmission of a large amount of data (enhanced mobile broadband (eMBB)), terminal power minimization and multi-terminal access (massive machine type communications (mMTC)), or high reliability and low latency (ultra-reliable and low-latency communications (URLLC)). The wireless communication module 392 may support a high-frequency band (for example, mmWave band) in order to accomplish a high data transmission rate, for example. The wireless communication module 392 may support various technologies for securing performance in a high-frequency band, for example, technologies such as beamforming, massive multiple-input and multiple-output (MIMO), full dimensional MIMO (FD-MIMO), arran antenna, analog beamforming, or large-scale antenna. The wireless communication module 392 may support various requirements specified in the electronic device 301, an external electronic device (for example, the electronic device 304), or a network system (for example, the second network 399). According to an embodiment, the wireless communication module 392 may support a peak data rate (for example, 30 Gbps or higher) for eMBB implementation, a loss coverage (for example, 163 dB or less) for mMTC implementation, or a U-plane latency (for example, 0.5 ms or less for a DL and a UL each, or 1 ms or less for a round trip) for URLLC implementation.

The antenna module 397 may transmit or receive a signal or power to or from the outside (e.g., the external electronic device) of the electronic device 301. According to an embodiment, the antenna module 397 may include one or more antennas, and, therefrom, at least one antenna appropriate for a communication scheme used in the communication network, such as the first network 398 or the second network 399, may be selected, for example, by the communication module 390 (e.g., the wireless communication module 392). The signal or the power may then be transmitted or received between the communication module 390 and the external electronic device via the selected at least one antenna.

According to various embodiments, the antenna module 397 may form a mmWave antenna module. According to an embodiment, the mmWave antenna module may include a printed circuit board, and RFIC which is disposed on the first surface (for example, lower surface) of the printed circuit board or adjacent thereto and is capable of supporting a designated high-frequency band (for example, mmWave band), and multiple antennas (for example, array antennas) which are disposed on the second surface (for example, upper surface or lateral surface) of the printed circuit board or adjacent thereto and are capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, a command or data may be transmitted or received between the electronic device 301 and the external electronic device 304 through the server 308 connected to the second network 399. Each external electronic device 302 or 304 may be of the same type as the electronic device 301 or of a different type. According to an embodiment, all or some of operations executed in the electronic device 301 may be executed in one or more external electronic devices among the external electronic device 302, 304, or 308. For example, when the electronic device 301 needs to perform a function or a service automatically or in response to a request of the user or another device, the electronic device 301 may request one or more external electronic devices to perform at least a part of the function or service, instead of or in addition to executing the function or service by itself. Upon receiving the request, one or more external electronic devices may execute at least a part of the requested function or service, or an additional function or service related to the request, and may transfer the result of execution to the electronic device 301. The electronic device 301 may provide the result as it is, or after additional processing, as at least a part of a response to the request. To this end, cloud computing, distributed computing, mobile edge computing (MEC), or client-server computing technology may be used, for example. The electronic device 301 may provide an ultra-low-latency service using distributed computing or mobile edge computing, for example. In an embodiment, the external electronic device 304 may include an Internet of thing (IoT) device. The server 308 may be an intelligent server using machine learning and/or a neural network. According to an embodiment, the external electronic device 304 or the server 308 may be included in the second network 399. The electronic device 301 may be applied to an intelligent service (for example, a smart phone, a smart city, a smart car, or health care), based on a 5G communication technology and an IoT-related technology.

An electronic device according to various embodiments disclosed herein may be of various types. An electronic device may include, for example, a portable communication device (for example, a smartphone), a computer device, a portable multimedia device, a portable medical device, a camera, a wearable device, a home appliance, or the like. An electronic device according to an embodiment of the disclosure is not limited to the above-mentioned devices.

Figure 4:
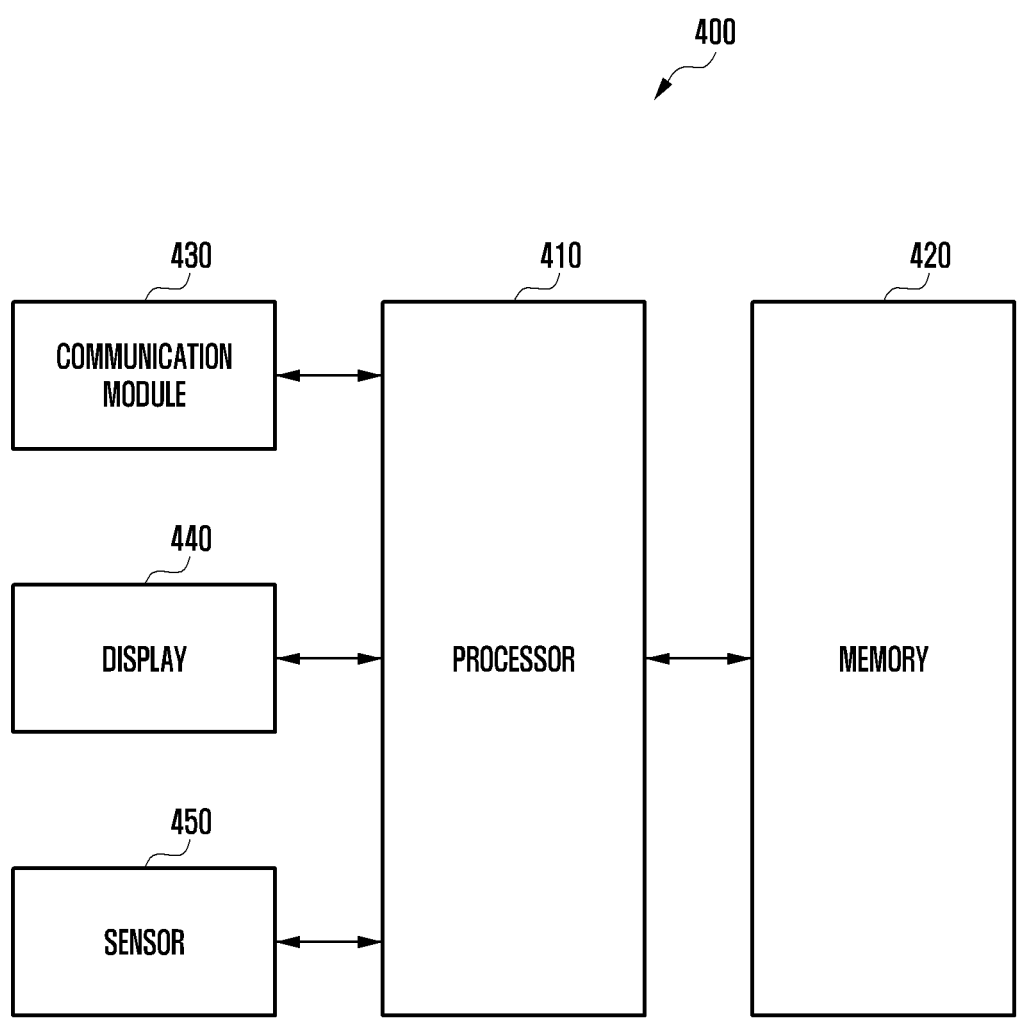
FIG. 4 is a block diagram illustrating an example configuration of an IoT device according to various embodiments.

FIG. 4 is a block diagram illustrating an example configuration of an IoT device according to various embodiments.

Referring to FIG. 4, the IoT device 400 may include a communication module (e.g., including communication circuitry) 430, a display 440, a sensor 450, a processor (e.g., including processing circuitry) 410, and a memory 420. The IoT device 400 may further include at least some of the components and/or functions of the electronic device 301 in FIG. 3, and may implement various embodiments of the disclosure even if some of the illustrated components are omitted or replaced.

According to various embodiments, the IoT device 400 may be implemented as a device in an IoT system (for example, the IoT device 100 in FIG. 1). For example, the IoT device 400 may be one of a hub device (for example, the tablet PC 111 or the TV 112 in FIG. 1) of the IoT system or a leaf device thereof (for example, the camera 121, the refrigerator 122, the lightbulb 123a, the digital thermometer 123b, or the motion sensor 123c in FIG. 1). Alternatively, the IoT device 400 may be a device, such as a smartphone or a tablet PC, including various sensors 450 (for example, a camera, an illuminance sensor, or a microphone) and having at least predetermined processors and/or memory resources. In this case, the IoT device 400 may install and execute an application (for example, upcycling application) supporting an IoT service, thereby providing the IoT service.

According to various embodiments, the display 440 may be implemented as one of a liquid crystal display (LCD) for displaying images, a light-emitting diode (LED) display, and an organic light-emitting diode (OLED), and is not limited thereto. The display 440 may be configured as a touch screen configured to sense a touch and/or proximate touch (or hovering) input using a part of the user's body (for example, a finger) or an input device (for example, a stylus pen). The display 440 may include at least some of the components and/or functions of the display module 160 in FIG. 1. At least a part of the display 440 may be flexible, and the display 440 may be implemented as a foldable display or a rollable display.

According to various embodiments, the communication module 430 may include various communication circuitry and support wireless communication (for example, Wi-Fi or cellular communication) and may transmit/receive data with another device of the IoT system or with a cloud network. The communication module 430 may communicate with another device through an access point (AP), or may directly communicate with another device through P2P (for example, Wi-Fi Direct or Wi-Fi Aware) communication.

According to various embodiments, the IoT device 400 may include at least one sensor 450. For example, the IoT device 400 may include a sensor 450 such as a camera, an illuminance sensor, a motion sensor, or a microphone. The IoT device 400 may transmit sensor 450 data acquired through the sensor 450 to a cloud network, and may provide an IoT environment in which another device in a local network is controlled based on the cloud (or edge).

According to various embodiments, the memory 420 may include a volatile memory and a nonvolatile memory, and may store various pieces of data used by at least one component (for example, the processor 410) of the IoT device 400 temporarily or permanently. The memory 420 may store various instructions that may be performed by the processor 410. Such instructions may include various control commands, including calculation and logical operations, data movements, or inputs/outputs that may be recognized by the processor 410.

According to various embodiments, the processor 410 may include various processing circuitry and be configured to perform operations or data processing related to control and/or communication of respective components of the IoT device 400, and may be connected to respective components of the IoT device 400, such as the sensor 450, the display 440, the communication module 430, and/or the memory 420, operatively, functionally, and/or electrically.

According to various embodiments, operations and data processing functions that the processor 410 may implement inside the IoT device 400 are not limited, but various embodiments for self-onboarding, in which the IoT device 400 is registered in the cloud network in real time without a separate prior registration process, will be described hereinafter. Operations of the processor 410 described below may be performed as instructions stored in the memory 420 are executed.

According to various embodiments, the processor 410 may execute an application that supports onboarding of the IoT device 400. For example, the application may be an application (for example, upcycling application) for providing an IoT service using a sensor 450 (for example, a camera, an illuminance sensor, a motion sensor, or a microphone) of an electronic device such as a smartphone or a tablet PC.

According to various embodiments, the processor 410 may acquire authentication information of an electronic device. The authentication information may include a certificate generated by an encryption algorithm based on a public key, such as an X.509 certificate, a public key, and/or a serial number. The IoT device 400 may store the generated authentication information in a designated area of the memory 420.

According to an embodiment, the IoT device 400 may use a certification generating module (for example, Samsung attestation key) of the IoT device 400 such that a certificate issuing server operated by the manufacturer of the IoT device 400 issues authentication information. According to an embodiment, the IoT device 400 may log in to a server operated by the manufacturer, based on an account, through an application, may receive a token, and may request the cloud network to provide authentication information, based on the received token, such that authentication information is issued.

According to various embodiments, the processor 410 may transmit authentication information to the cloud network through the communication module 430, thereby registering authentication information of the electronic device. For example, the IoT device 400 may transmit authentication information acquired through a Wi-Fi access point to an access gateway (for example, great gate) of the cloud network, and the authentication information may be stored in a device identification server (for example, device identity).

According to various embodiments, the processor 410 may generate configuration information of an electronic device, based on a user input through an application. For example, the configuration information may include a device name, location information, and room information. For example, the IoT device 400 may receive a location list and a room list from a location server (for example, location service) of the cloud network, may output information regarding multiple locations on the location list and multiple rooms on the room list to the application, and may select a location and a room according to the user's selection. In this case, the location server may provide the IoT device 400 with a list of location/room information of other IoT devices registered through the same account as the IoT device 400. The IoT device 400 may transmit configuration information that has been input thereto to the cloud network such that the same is stored in the cloud network.

According to various embodiments, after the authentication information is registered, the processor 410 may transmit configuration information (for example, location information or room information) and device information (for example, serial number, MNID, product ID, onboarding ID, or model name) to the cloud network, and may request onboarding of the IoT device 400. According to an embodiment, the processor 410 may request the access gateway of the cloud network to provide access information for onboarding (for example, message queuing telemetry transport (MQTT) broker URL), and may receive access information regarding a broker server closest from the access gateway. The processor 410 may access the cloud network through the received access information and request onboarding.

According to various embodiments, the cloud network may conduct a process of onboarding the IoT device 400, based on configuration information, device information, and/or authentication information received from the IoT device 400. The cloud network may verify the IoT device 400 using authentication information transmitted by the IoT device 400 and pre-registered authentication information and, if verification is completed, may map device information of the IoT device 400, configuration information, and a user-selected function (for example, trigger event or motion command) to a device identification server (for example, device identity) and store the same.

According to various embodiments, if onboarding of the IoT device 400 is completed, the IoT device 400 may perform a function selected through an application in the IoT environment. According to an embodiment, the IoT device 400 may capture peripheral images with a camera and may transmit the same to the cloud network. The cloud network may transmit images used by the IoT device 400 to the user device of the corresponding user in a real-time streaming type such that indoor images can be identified in the user device. According to an embodiment, the IoT device 400 may sense the peripheral illuminance with the sensor 450 (for example, illuminance sensor) and transmit the same to the cloud network, and the cloud network may transmit a command such that a function (for example, lightbulb on) mapped to the illuminance value is executed with regard to another IoT device (for example, lightbulb) in a local network mapped to the IoT device 400.

Figure 5:
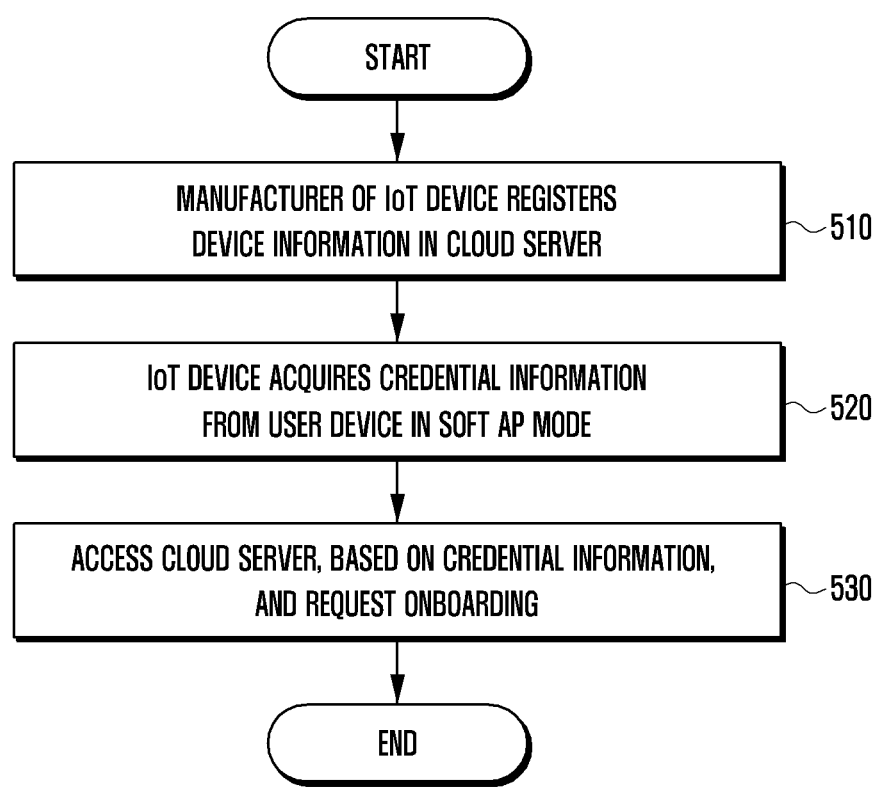
FIG. 5 is a flowchart illustrating an example IoT device onboarding method according to various embodiments.

FIG. 5 is a flowchart illustrating an example IoT device onboarding method according to various embodiments.

FIG. 5 illustrates an embodiment in which the manufacturer of an IoT device (for example, the IoT device 400 in FIG. 4) registers device information and authentication information of the IoT device in a cloud network in advance, and connects to a user device (for example, the user device 130 in FIG. 1) in a soft AP mode, thereby sending an onboarding request to the cloud network through the user device.

According to an embodiment, in operation 510, the manufacturer of the IoT device may register authentication information and device information of the IoT device and in a cloud network. For example, in an IoT device manufacturing process, the manufacturer may register authentication information and device information of the IoT device through a develop workspace provided by the cloud network. The develop workspace may be an online environment in which the cloud network provides services related to authentication and registration of the IoT device.

The IoT device manufacturer may access to the develop workspace through an account, may register device information (for example, device type, profile information) of the IoT device, such as a device type and profile information, and may register authentication information such as ED25519, X.509. In addition, the IoT device manufacturer may update device and onboarding configuration information using a software development kit (SDK) of the IoT device, and may store (or flash) pieces of software necessary for the cloud service.

Thereafter, a process in which a user who purchased the IoT device onboards the IoT device into the cloud network may proceed.

According to an embodiment, in operation 520, the IoT device may acquire credential information from the user device. In this case, the IoT device may operate in a soft AP mode so as to establish Wi-Fi connection to the user device. The credential information acquired by the IoT device from the user device may include Wi-Fi provisioning information, cloud provisioning information, and device configuration provisioning information. For example, the Wi-Fi provisioning information may include an SSID and a password of an access point to be accessed, stored in the user device, the cloud provisioning information may include a broker URL to be accessed and authentication information, acquired by the user device from the cloud network, and the device configuration provisioning information may include additional information such as the location, language, nation code, time zone, model name, or device name, input through the user device.

According to an embodiment, in operation 530, the IoT device may access the cloud network and request onboarding, based on the credential information received from the user device.

In the embodiment in FIG. 5, the IoT device provides no function for inputting device configuration information, such as the location or device name, and corresponding information may need to be input through the user device. To this end, the IoT device may enter a soft AP mode, and the user device may access the soft AP and provide device configuration provisioning information and cloud provisioning information. The IoT device may enter a discoverable mode through Bluetooth (or Bluetooth Low Energy) advertising and may select an adjacent user device, thereby conducting a setup process.

Such a scheme may have a stability problem, the user device needs to release existing Wi-Fi connection with other devices, and a problem of increased possibility of onboarding failure may occur in the process of exchanging information between the IoT device and the user device.

Hereinafter, various example embodiments for enabling the IoT device to onboard itself into the cloud network without connecting to the user device will be described in greater detail below with reference to FIG. 6 to FIG. 14.

Figure 6:
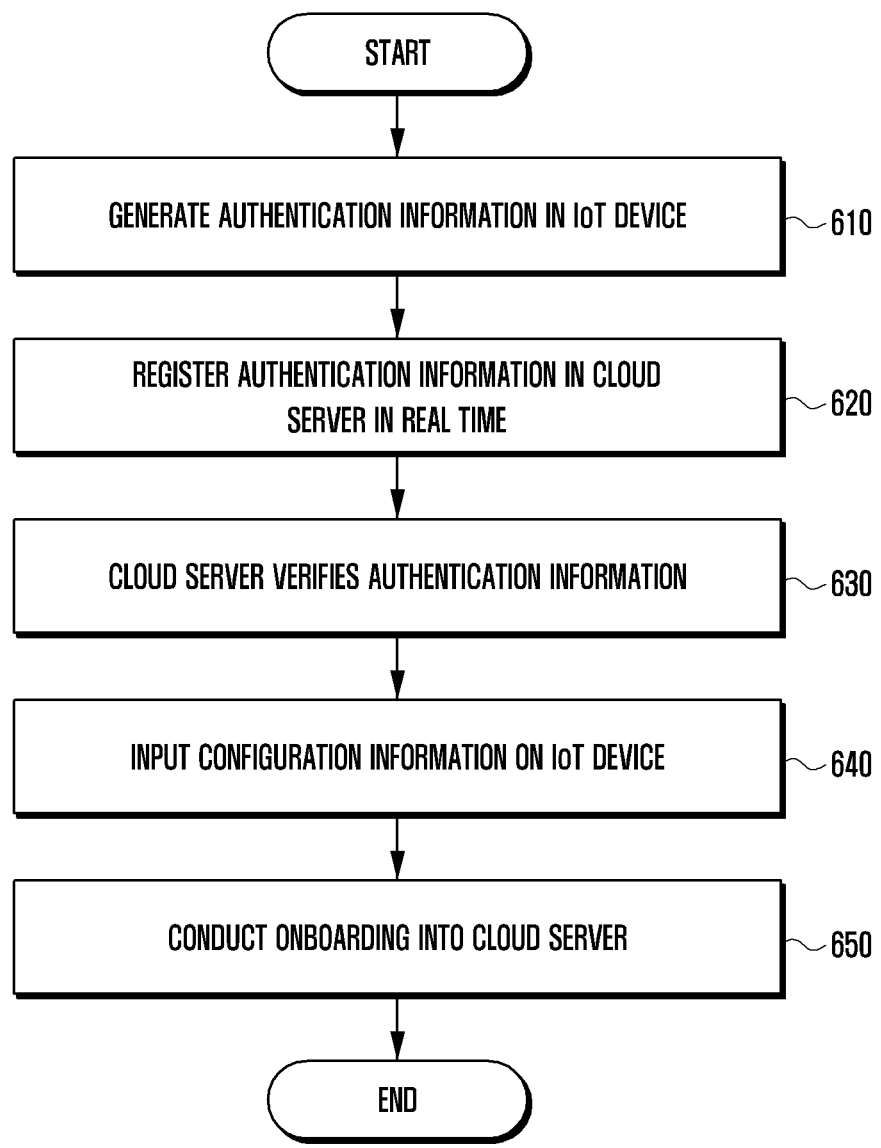
FIG. 6 is a flowchart illustrating an example IoT device onboarding method according to various embodiments.

FIG. 6 is a flowchart illustrating an example IoT device onboarding method according to various embodiments.

According to various embodiments, in operation 610, the IoT device (for example, the IoT device 400 in FIG. 4) may generate authentication information. For example, the authentication information may include a certificate generated by an encryption algorithm based on a public key, such as an X.509 certificate, a public key, and/or a serial number. The IoT device may store the generated authentication information in a designated area of the memory.

According to an embodiment, the IoT device may use a certification generating module (for example, Samsung attestation key) of the IoT device such that a certificate issuing server operated by the manufacturer of the IoT device issues authentication information. This example will be described in greater detail below with reference to FIG. 7.

According to an embodiment, the IoT device may log in to a server operated by the manufacturer, based on an account, through an application (for example, upcycling application), may receive a token, and may request the cloud network to provide authentication information, based on the received token, such that authentication information is issued. This example will be described in greater detail below with reference to FIG. 8.

According to various embodiments, in operation 620, the IoT device may register authentication information in the cloud network in real time. For example, the IoT device may transmit authentication information acquired through a Wi-Fi access point to an access gateway (for example, great gate) of the cloud network. For example, the access gateway may be a server device or a service module for receiving connection and/or device events of respective devices of a local network in the cloud network. In an embodiment, the IoT device may operate in a soft AP Mode and directly transmit authentication information to the cloud network without connecting to the user device.

According to various embodiments, in operation 630, the cloud network may verify authentication information transmitted by the IoT device. For example, authentication information may be transmitted to an access gateway (for example, great gate) of the cloud network, and the access gateway may request a device identification server (for example, device identify) to verify the authentication information. If the authentication information is verified by the device identification server, the authentication information and the device information of the IoT device may be mapped and stored in the device identification server.

According to various embodiments, in operation 640, the IoT device may input configuration information, based, for example, on a user input, using an application. For example, the configuration information may include a device name, location information, and room information. For example, the IoT device may receive a location list and a room list from a location server (for example, location service) of the cloud network, may output information regarding multiple locations on the location list and multiple rooms on the room list to the application, and may select a location and a room according to the user's selection. In this case, the location server may provide the IoT device with a list of location/room information of other IoT devices registered through the same account as the IoT device. The IoT device may transmit configuration information that has been input thereto to the cloud network such that the same is stored in the cloud network.

According to various embodiments, in operation 650, the cloud network may conduct an IoT device onboarding process, based on configuration information, device information, and/or authentication information received from the IoT device. According to an embodiment, the application of the IoT device may request the access gateway of the cloud network to provide access information for onboarding (for example, message queuing telemetry transport (MQTT) broker URL), and may receive access information regarding a broker server closest from the access gateway. The IoT device may then access the cloud network through the access information and go through an authentication process, thereby completing onboarding.

If onboarding of the IoT device is completed, the same may operate as a hub device or a leaf device in the local network according to a function selected through the application.

Figure 7:
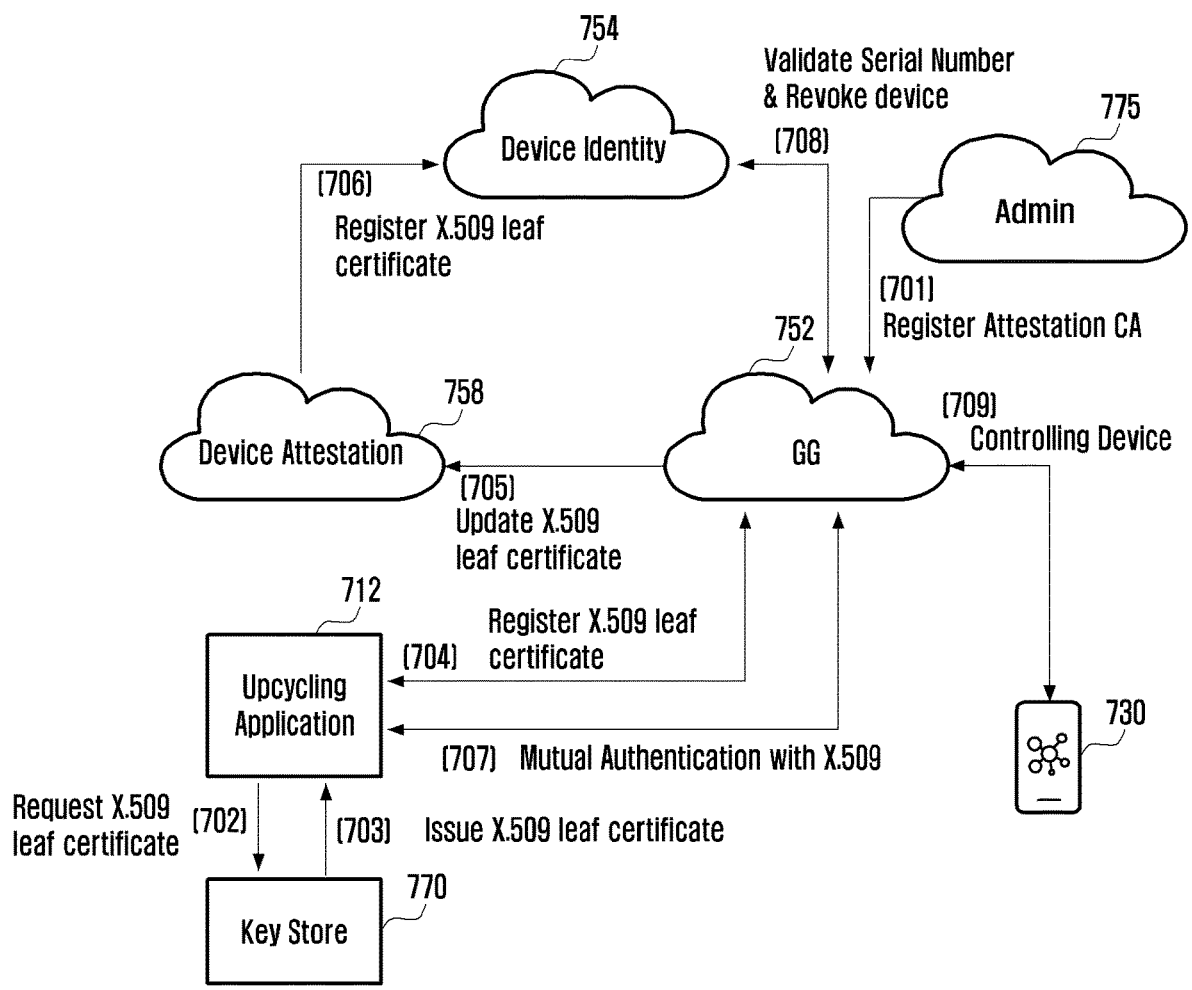
FIG. 7 is a diagram illustrating an example method in which an IoT device acquires authentication information according to various embodiments.

FIG. 7 is a diagram illustrating an example method in which an IoT device according to an embodiment acquires authentication information according to various embodiments.

According to an embodiment, the IoT device may use a certification generating module such that a certificate issuing server (e.g., key store) 770 issues authentication information, and may transmit the issued authentication information to a cloud network, thereby requesting registration of the authentication information.

According to various embodiments, in operation 701, an application (for example, SmartThings application) of a user device 130 may register the authentication information in the cloud network through a manager server 775. For example, the manager server 775 may be a server device operated by the manufacturer of the user device 130, and may store authentication information necessary to provide a cloud service to the user device.

According to various embodiments, in operation 702, an application 712 (for example, upcycling application) of the IoT device may request the certificate issuing server 770 (for example, key store) to provide authentication information. For example, the certificate issuing server 770 may be a certificate issuing server operated by the IoT device manufacturer, and the IoT device may use a certificate generating module (for example, Samsung attestation key) such that authentication information is issued. According to an embodiment, the authentication information may be a leaf certificate or an end-entity certificate, and may be generated by an encryption algorithm based on a public key, such as an X.509 certificate.

According to various embodiments, in operation 703, the certificate issuing server 770 may issue a certificate at the request of the IoT device.

According to various embodiments, in operation 704, the application 712 of the IoT device may register the issued authentication information in the cloud network through an access gateway 752 (for example, great gate).

According to various embodiments, in operation 705, the access gateway 752 may update authentication information transmitted to an authentication server 758 by the IoT device. In operation 706, the authentication server 758 may register authentication information of the IoT device in a device identification server 754.

According to various embodiments, if a procedure for onboarding the IoT device proceeds after the authentication information is registered, a process of mutual authentication between authentication information of the IoT device and authentication information registered in the cloud network in operation 707. For example, the mutual authentication process may be performed based on an X.509 certificate. In operation 708, the access gateway 752 and the device identification server 754 may verify the serial number of the IoT device, and may revoke device information in the device identification server 754.

According to various embodiments, upon completion of onboarding of the IoT device into the cloud network, the IoT device may be controlled through the user device 130 in operation 709. For example, the IoT device may make a configuration, such as device on/off or event/command registration, according to a user input in the application 712 (for example, SmartThings application 712), and may provide data acquired from a sensor (for example, a camera) of the IoT device.

In an embodiment, since a certificate issuing service operated by the manufacturer is used, no separate cloud system needs to be operated to issue a certificate, and authentication information may be stored and managed in a safe key store. In addition, when the application 712 (for example, upcycling application) of the IoT device is deleted and then reinstalled, unique information may be maintained through the serial number and IMEI of the IoT device. Even if multiple applications 712 exist, the unique information and the application 712 ID are combined to generate various pieces of unique information with regard to an identical device, and the same may be registered based thereon, thereby supporting uniqueness of the device with regard to multiple applications 712 of the same style.

Figure 8:
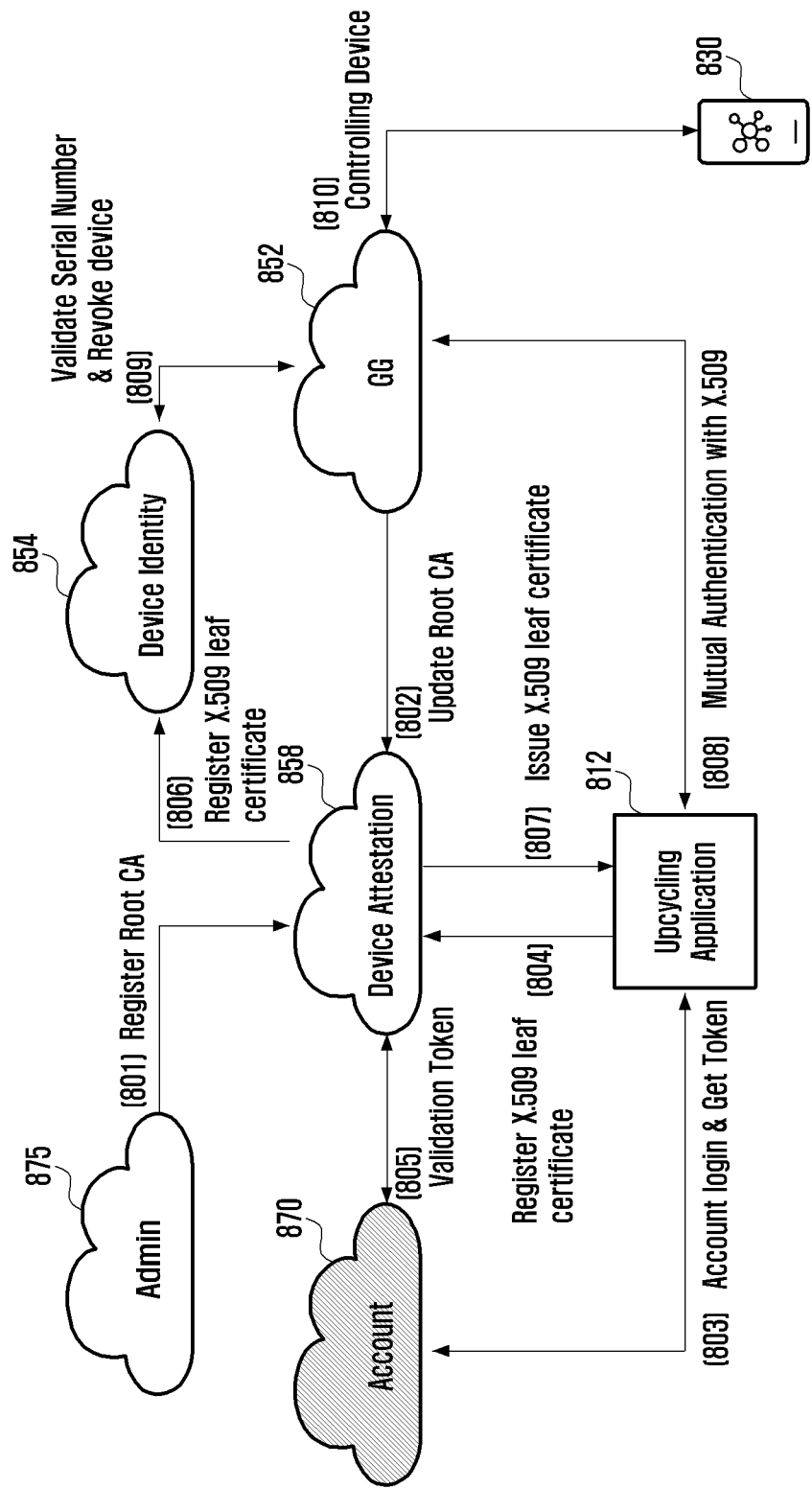
FIG. 8 is a diagram illustrating an example method in which an IoT device acquires authentication information according to various embodiments.

FIG. 8 is a diagram illustrating an example method in which an IoT device acquires authentication information according to various embodiments.

According to various embodiments, the IoT device may log in, based on an account, through an application 812 (for example, upcycling application) so as to receive a token, may request a cloud network to provide authentication information, based on the received token, and may receive authentication information issued by the cloud network.

According to various embodiments, in operation 801, a manager server 875 may register a root CA in an authentication server 858 of the cloud network.

According to various embodiments, in operation 802, an access gateway 852 may update the root CA in the authentication server 858.

According to various embodiments, in operation 803, the IoT device may log in to an account server 870 (for example, Samsung account) operated by the manufacturer of the IoT device, based on an account of an application 812 (for example, upcycling application), and may acquire a token.

According to various embodiments, in operation 804, the application 812 of the IoT device may request registration in the authentication server 858, based on authentication information.

For example, the IoT device may transmit the token acquired from the account server 870 to the authentication server 858, and the authentication server may authenticate the IoT device based on the token. For example, the authentication information may be a leaf certificate or an end-entity certificate, and may be an X.509 certificate.

According to various embodiments, in operation 805, the authentication server 858 may compare the token issued by the account server 870 and the token transmitted by the IoT device, thereby verifying the token validity.

According to various embodiments, if token validity is verified, the authentication server 858 may register authentication information in the device identification server 854 in operation 806 and may issue authentication information to the IoT device in operation 807.

According to various embodiments, if a procedure for onboarding the IoT device proceeds after the authentication information is registered, a process of mutual authentication between authentication information of the IoT device and authentication information registered in the cloud network (for example, access gateway 852) in operation 808. In operation 809, the access gateway 852 and the device identification server 854 may verify the serial number of the IoT device, and may revoke device information in the device identification server 854.

According to various embodiments, upon completion of onboarding of the IoT device into the cloud network, the IoT device may be controlled through the user device 830 in operation 810. For example, the IoT device may make a configuration, such as device on/off or event/command registration, according to a user input in the application 812 (for example, SmartThings application 812), and may provide data acquired from a sensor (for example, a camera) of the IoT device.

In an embodiment, an authentication key may be issued, based on an account, by the authentication server 858 of the cloud network such that a certification issued with regard to each account is managed. In addition, the IoT device needs no certificate generating module for issuing a separate certificate.

Figure 9:
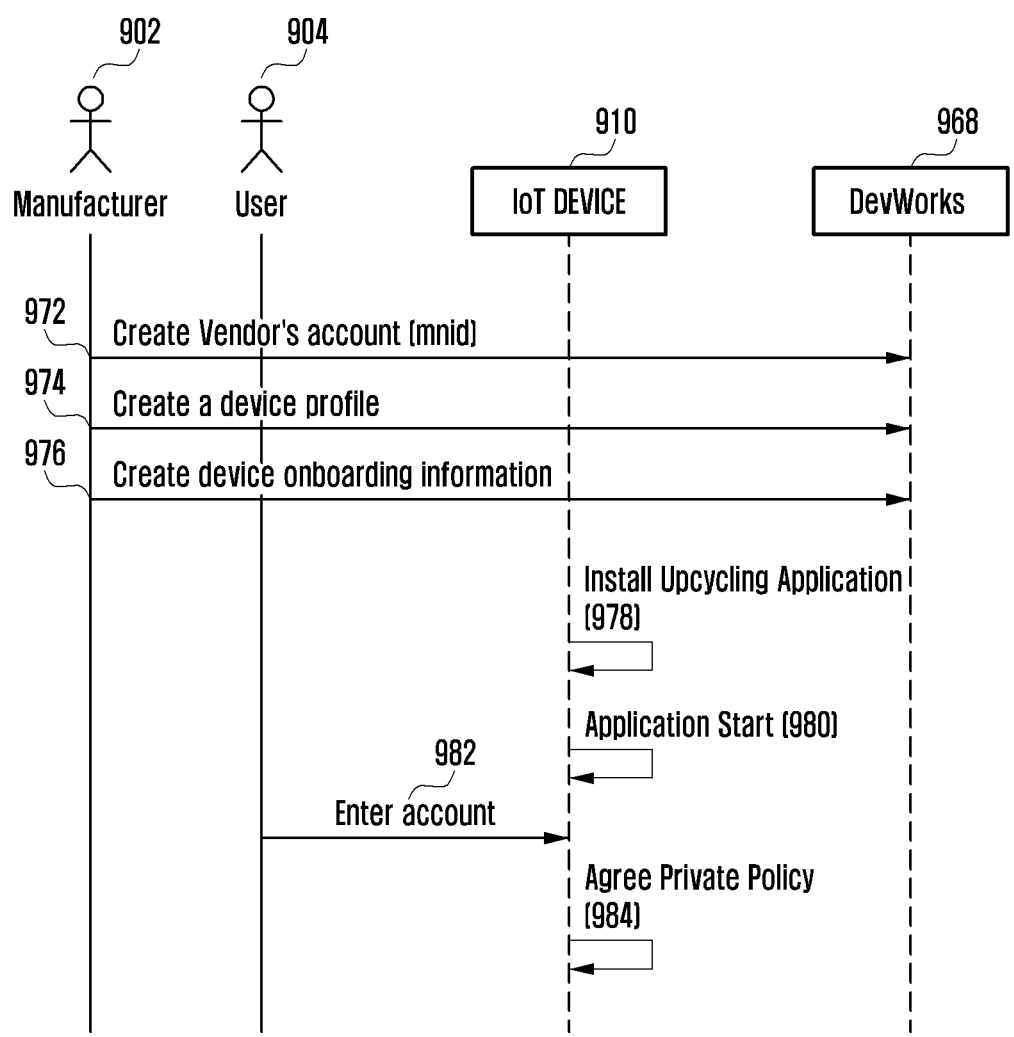
FIG. 9 is a signal flow diagram illustrating an example process in which a manufacturer registers IoT device information according to various embodiments.

FIG. 9 is a signal flow diagram illustrating an example process in which a manufacturer registers IoT device information according to various embodiments.

According to various embodiments, the manufacturer 902 of the IoT device 910 may register information necessary to onboard the IoT device 910 through a developer workspace 968 provided by a cloud network. For example, a vendor account (for example, MNID) may be generated in operation 972, device profile information may be generated in operation 974, and device onboarding information may be generated in operation 976.

According to various embodiments, even if the manufacturer 902 of the IoT device 910 does not pre-register information necessary to onboard the IoT device 910 through a developer workspace 968, the IoT device 910 may generate authentication information on its own using an application and may register the same in the cloud network.

According to various embodiments, a user 904 who purchased the IoT device 910 may install an application (for example, upcycling application) that supports an IoT device in the IoT device 910 in operation 978. For example, the application may be used for a service for providing an IoT service using a sensor (for example, a camera, an illuminance sensor, or a microphone) of a secondhand electronic device (for example, a smartphone or a tablet PC).

In operation 980, the IoT device 910 may execute an application. In operation 982, the user 904 may input an account through the application so as to log in. In operation 984, the user 904 may agree to a security policy, thereby conducting an onboarding procedure into the cloud network in order to provide an IoT service through the IoT device 910.

Figure 10:
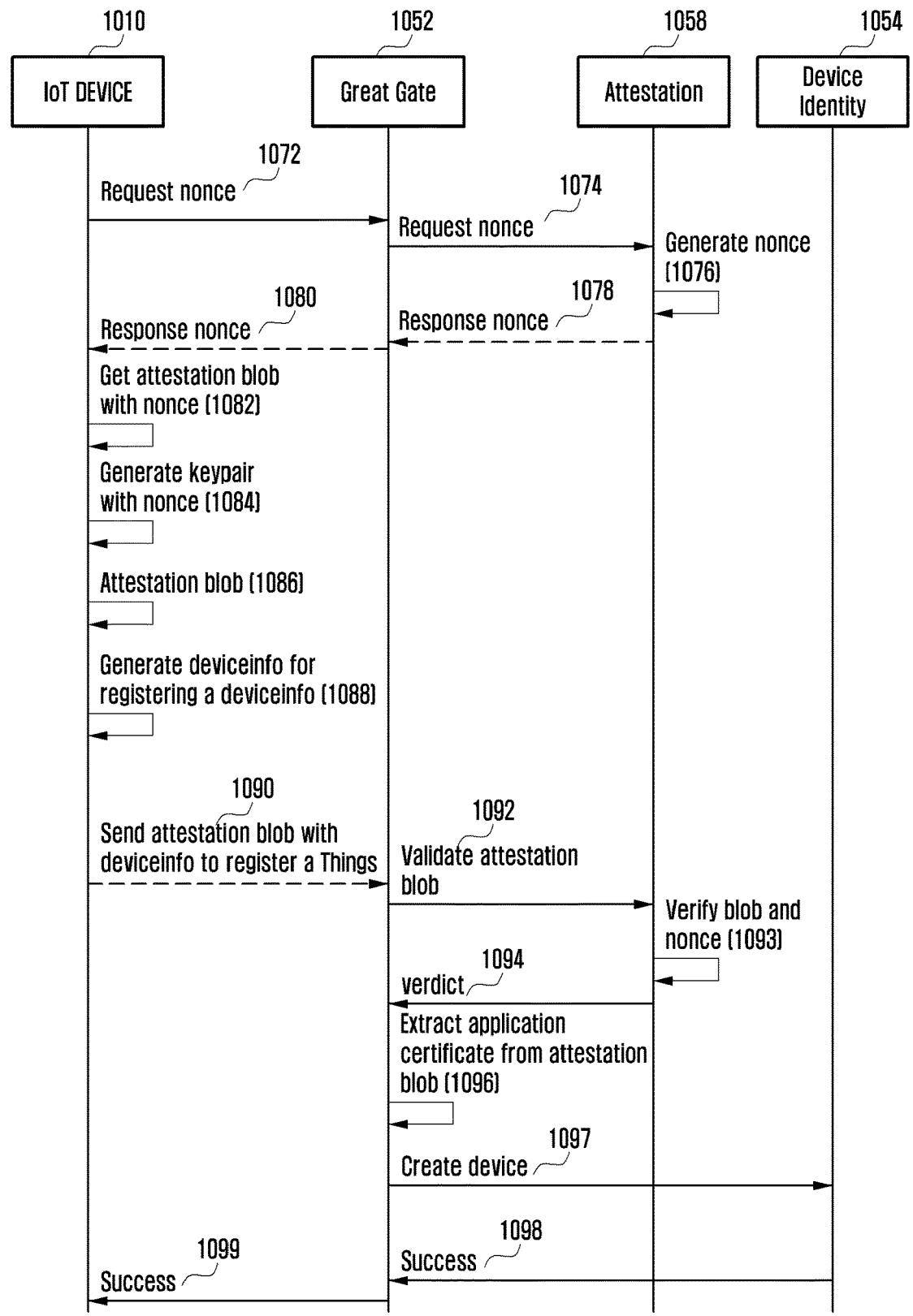
FIG. 10 is a signal flow diagram illustrating an example process of registering IoT device authentication information in order to onboard an IoT device according to various embodiments.

FIG. 10 is a signal flow diagram illustrating an example process of registering IoT device authentication information in order to onboard an IoT device according to various embodiments.

FIG. 10 relates to an embodiment in which an IoT device 1010 registers authentication information issued by a certificate issuing server through a certificate generating module (for example, Samsung attestation key) in an IoT server. In FIG. 10, the access gateway 1052 (or great gate), the authentication server 1058 (or attestation), and the device identification server 1054 (or device identity) may be implemented as server devices in a cloud network, respectively.

Hereinafter, operations 1072 to operation 1088 relate to a procedure in which the IoT device 1010 generates authentication information, and operation 1090 to operation 1099 relate to a procedure in which the generated authentication information is then registered in the cloud network.

According to various embodiments, in operation 1072, an application (for example, upcycling application) of the IoT device 1010 may request the access gateway 1052 to provide a nonce in order to register authentication information. For example, the IoT device 1010 may include an MQTT protocol, device information, authentication information (for example, Samsung attestation key), and/or a nonce request in a HTTP POST type, and may transmit the same. For example, the authentication information may be a certificate issued by a certificate issuing server through a certificate generating module (for example, Samsung attestation key).

According to various embodiments, in operation 1074, the access gateway 1052 may request the authentication server 1058 to provide a nonce, and in operation 1076, the authentication server 1058 may generate a nonce. In operation 1078, the authentication server 1058 may provide the generated nonce to the access gateway 1052, and in operation 1080, the access gateway 1052 may provide the nonce to the IoT device 1010 as a response.

According to various embodiments, in operation 1082, the IoT device 1010 may acquire an authentication object (for example, binary large object (blob)) including the nonce. In operation 1084, the IoT device 1010 may generate a key pair including the nonce. For example, the generated key pair may include a public key (mPubKey) and a private key (mPrivKey), and the authentication object may include device authentication information (attestation certificate) and application authentication information (application certificate) including the nonce and the public key. In operation 1086, the IoT device 1010 may verify and/or store the generated authentication object.

According to various embodiments, in operation 1088, the IoT device 1010 may generate device information of the IoT device 1010 for registration in the cloud network. For example, the device information may include a serial number, an MNID, a product ID, an onboarding ID, and/or a model name.

According to the above process, device information and authentication information for onboarding the IoT device 1010 may be generated.

According to various embodiments, in operation 1019, the IoT device 1010 may transmit the generated authentication object and device information to the access gateway 1052 in order to register the IoT device 1010. Table 1 illustrates an example of HTTP message transmitted to the access gateway 1052 when the IoT device 1010 requests onboarding.

TABLE 1

HTTP / POST / MQTT / devices / SAK / identity
{
"attestationBlob": "based64 (application certificate + attestation certificate)",
"deviceIdentityRequest":{
"serialNumber": "A1B2CD3EFG4H",
"mind": "OAFD",
"productID": "string",
"operationType": "COMMERCIAL"
"operationState": "BLOCKED"
"onboardingID": "string"
"modelName": "string"
}
}

According to various embodiments, in operation 1092, the access gateway 1052 may transfer an authentication object to the authentication server 1058, in operation 1093, the authentication server 1058 may verify the transferred authentication object, and in operation 1094, the authentication server 1058 may transfer the result of authentication to the access gateway 1052. In operation 1096, the access gateway 1052 may acquire application authentication information (application certificate) from the authentication object validity verification. According to various embodiments, if authentication of the IoT device 1010 is completed, the access gateway 1052 may request the device identification server 1054 to register (or generate) device information in operation 1097. Table 2 shows an example of a message transmitted by the access gateway 1052 to request device registration.

TABLE 2

POST / identity / deviceinfo
{
"sn": "string",
"meta":{
"vendor": "string",
"mind": "string",
"productID": "string",
"onboardingID": "string",
"modelName": "string",
"state": operationState,
"type": "operationType,
"sku": ["string"],
"partner": "string"
}
"key":{
"type": "ECPUKEY", TABLE 2-continued "crv": "NISTP256",
"key": "pubkey of application certificate"
}
}

According to various embodiments, if information of the IoT device 1010 is registered in the device identification server 1054, the device identification server 1054 may transfer information indicating a registration success to the access gateway 1052 in operation 1098, and the access gateway 1052 may transmit information indicating a registration success to the IoT device 1010 in operation 1099.

Figure 11:
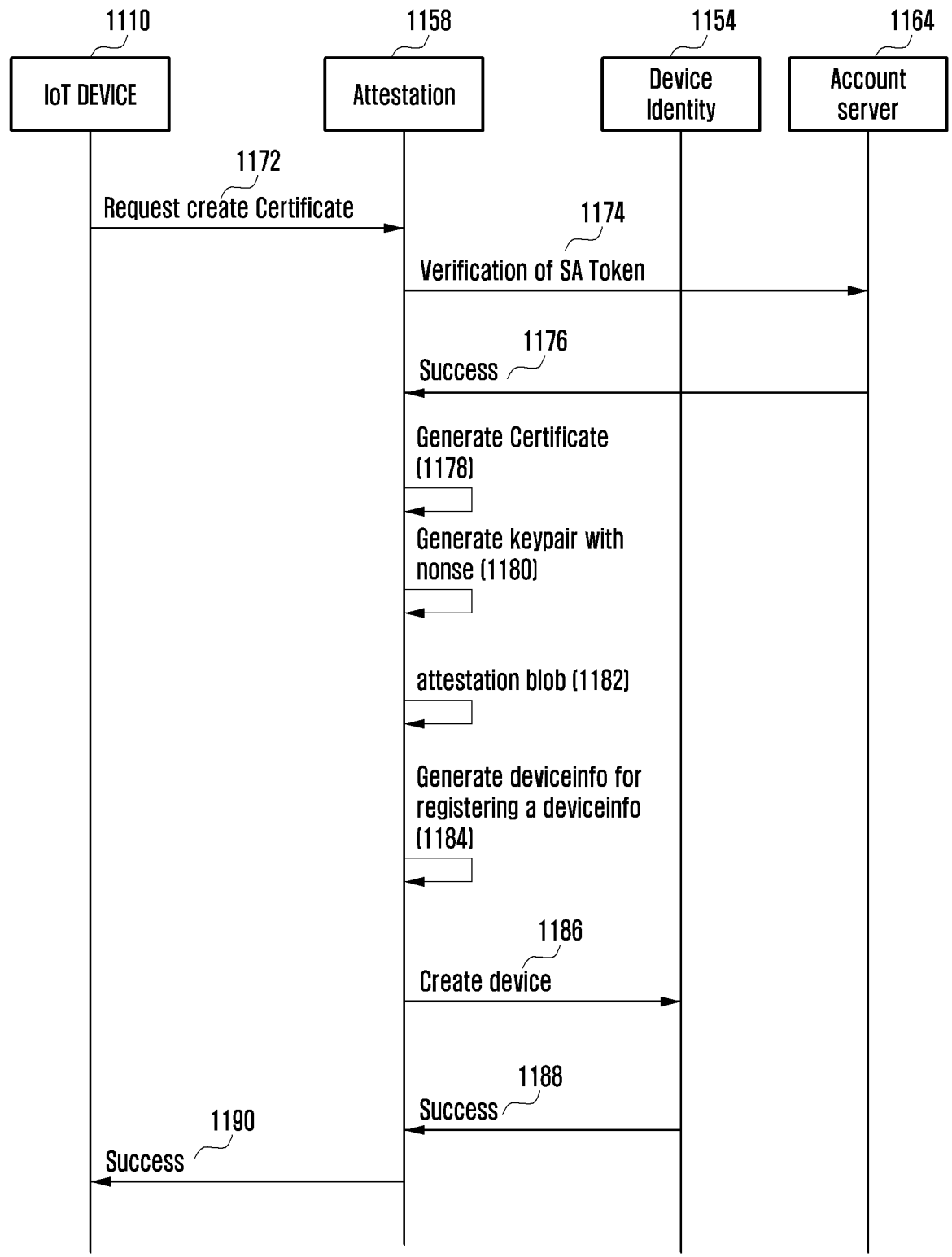
FIG. 11 is a signal flow diagram illustrating an example process of registering IoT device authentication information in order to onboard an IoT device according to various embodiments.

FIG. 11 illustrates a process of registering IoT device authentication information in order to onboard an IoT device according to various embodiments.

FIG. 11 is a signal flow diagram illustrating an example in which an IoT device 1010 receives authentication information which is issued, based on an account, by an authentication server 1158 of a cloud network according to various embodiments. In FIG. 11, the authentication server 1158 (or attestation), the device identification server 1154 (or device identity), and the account server 1164 may be implemented as server devices in a cloud network, respectively.

According to various embodiments, in operation 1172, the IoT device 1110 may request the authentication server 1158 to generate authentication information. For example, the IoT device 1110 may post an external certificate, SA token authentication, device information (for example, MNID, product ID, onboarding ID, and/or model name) in the authentication server 1158. According to an embodiment, the IoT device 1110 may log in to the account server 1164 operated by the manufacturer of the IoT device 1110, based on an account of an application, may acquire a token, and may transmit the same to the authentication server 1158 at a request to generate authentication information.

According to various embodiments, in operation 1174, the authentication server 1158 may request the account server 1164 to verify the SA token. In operation 1176, the account server 1164 may respond to the authentication server 1158 if SA token verification succeeds.

According to various embodiments, in operation 1178, the authentication server 1158 may generate authentication information, and in operation 1180, the authentication server 1158 may generate a key pair including a nonce. For example, the generated key pair may include a public key (mPubKey) and a private key (mPrivKey), and the authentication object may include device authentication information (attestation certificate) and application authentication information (application certificate) including the nonce and the public key. In operation 1182, the authentication server 1158 may store the generated authentication object.

According to various embodiments, in operation 1184, the authentication server 1158 may generate device information of the IoT device 1110 for registration in the cloud network. For example, the device information may include a serial number, an MNID, a product ID, an onboarding ID, and/or a model name. In operation 1186, the authentication server 1158 may request the device identification server 1154 to register (or generate) the IoT device 1110. The authentication server 1158 may transmit a message, for example, the message in Table 2 above, to the device identification server 1154 to request device registration.

According to various embodiments, when information of the IoT device 1110 is registered in the device identification server 1154, the device identification server 1154 may transfer information indicating a registration success to the authentication server 1158 in operation 1188, and the authentication server 1158 may transmit information indicating a registration success to the IoT device 1110 in operation 1190.

Figure 12:
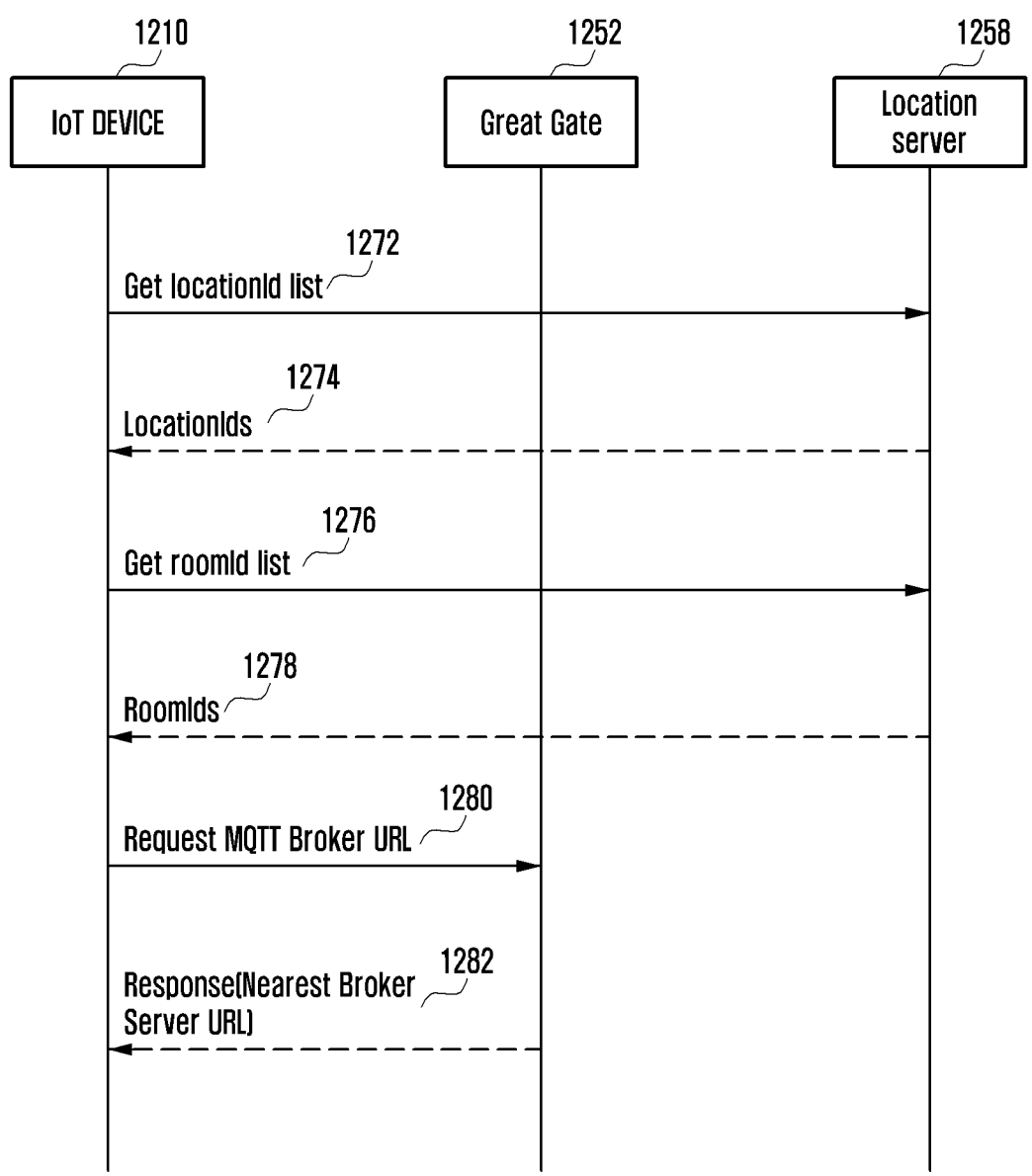
FIG. 12 is a signal flow diagram illustrating an example process of acquiring a broker URL in order to onboard an IoT device according to various embodiments.

FIG. 12 is a signal flow diagram illustrating an example process of acquiring a broker URL in order to onboard an IoT device according to various embodiments.

FIG. 12 illustrates a process in which authentication information of an IoT device 1210 is registered in a cloud network, pieces of additional information for onboarding are received as an input, and a broker URL necessary for onboarding is acquired. According to various embodiments, the IoT device 1210 may input configuration information (for example, location information and/or room information) based on a user input through an application.

According to various embodiments, in operation 1272, the IoT device 1210 may request a location server 1258 of the cloud network to provide a location information list, and in operation 1274, may receive the location information list from the location server 1258. For example, the location information list may include information regarding the location of other IoT devices registered through the same account as the IoT device 1210.

According to various embodiments, in operation 1276, the IoT device 1210 may request the location server 1258 of the cloud network to provide a room information list, and in operation 1278, may receive the room information list from the location server 1258. For example, the room information list may include information regarding rooms in which other IoT devices registered through the same account as the IoT device 1210 are installed.

According to various embodiments, the IoT device 1210 may provide the received location information list and room information list to an application, and may receive information regarding a location and a room, at which the corresponding IoT device 1210 is installed, according to the user's input.

According to various embodiments, in operation 1280, the IoT device 1210 may request the access gateway 1252 to provide access information for onboarding. For example, the access information may include a message queuing telemetry transport (MQTT) broker URL. For example, the IoT device 1210 may transmit a message including an MQTT, a broker, and an input location ID to the access gateway 1252 in an HTTP GET type. In operation 1282, the IoT device 1210 may receive access information regarding a closest broker server from the access gateway 1252.

Figure 13:
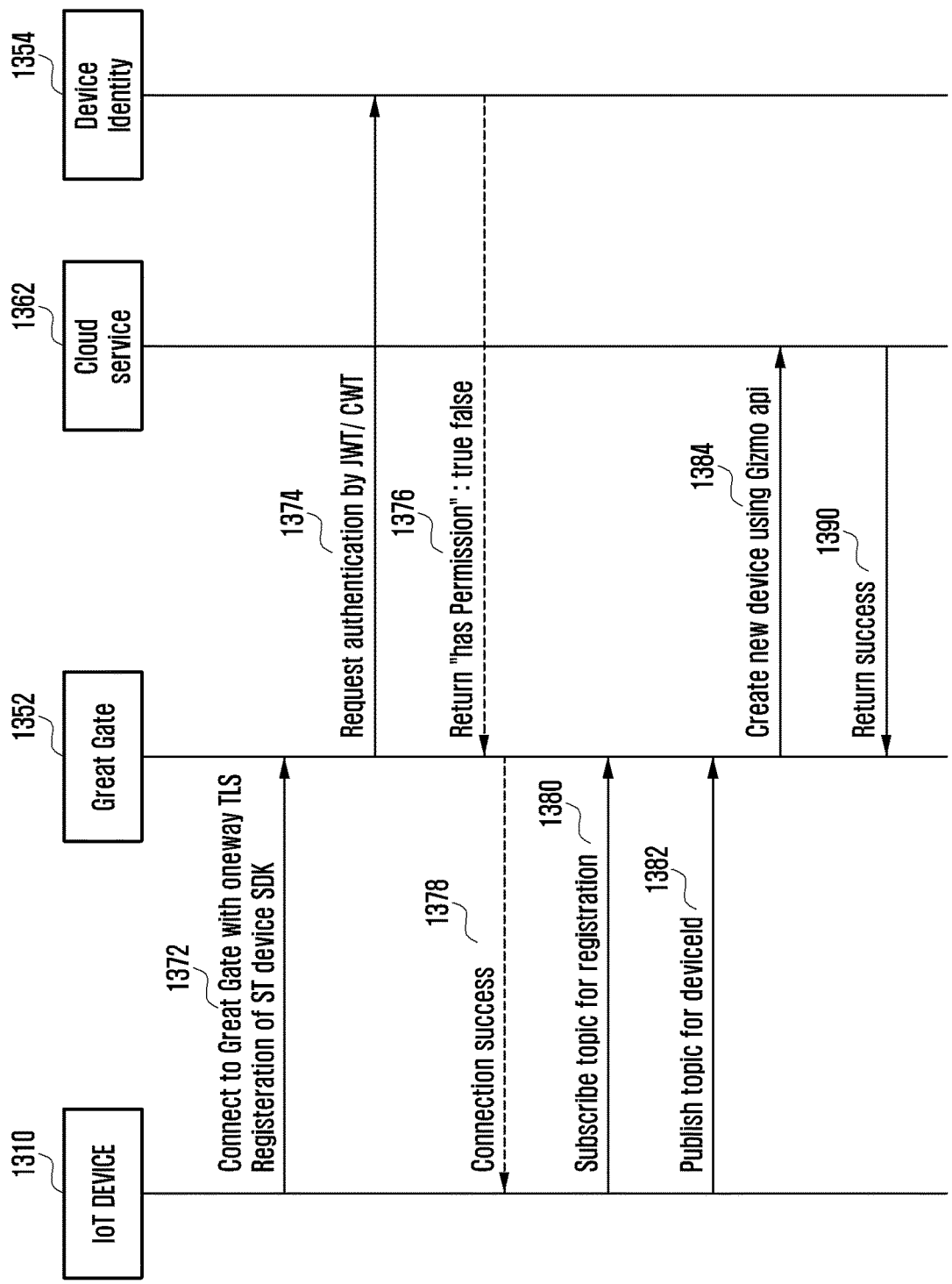
FIG. 13 is a signal flow diagram illustrating an example IoT device onboarding process according to various embodiments.

FIG. 13 is a signal flow diagram illustrating an example IoT device onboarding process according to various embodiments.

According to various embodiments, in operation 1372, the IoT device 1310 may be connected to an access gateway 1352. In this case, the IoT device 1310 may be connected to the access gateway 1352 using one-way transport layer security (TLS). The IoT device 1310 may register information of the IoT device 1310 in a cloud network using a device SDK. For example, the device SDK may be an SDK used to register an IoT device in a cloud network (for example, SmartThings platform). According to an embodiment, the IoT device 1310 may attempt to access the access gateway 1352 using a serial number as the user ID and using a Java script object notation (JSON) web token (JWT) or a concise binary object representation (CBOR) web token (CWT), signed with a secret key, as the password.

According to various embodiments, in operation 1374, the access gateway 1352 may request the device identification server 1354 to authenticate the JWT and/or CWT received from the IoT device 1310. In operation 1376, after authenticating the JWT and/or CWT, the device identification server 1354 may return information regarding whether or not to permit an access, to the access gateway 1352.

According to various embodiments, if an access is permitted, the access gateway 1352 may send a connection success replay to the IoT device 1310 in operation 1378.

According to various embodiments, in operation 1380, the IoT device 1310 may subscribe a topic for registering the IoT device 1310 to the access gateway 1352. For example, the IoT device 1310 may subscribe a serial number necessary for onboarding. The access gateway 1352 may operate as a broker of an MQTT protocol.

According to various embodiments, in operation 1382, the IoT device 1310 may publish a topic for the device ID of the IoT device 1310 to the access gateway 1352. For example, the IoT device 1310 may publish a topic including an MNID, a VID, a device type, a DIP key set, and a lookup ID.

According to various embodiments, in operation 1384, the access gateway 1352 may generate new device information in the cloud service 1362 by using a Gizmo API. In operation 1390, upon completing device information generation, the cloud service 1362 may return a success to the access gateway 1352. Device information published by the IoT device 1310 may be transferred to Gizmo, Dove, Pooch, or OCF Route of the cloud service 1362, respectively, and may be transferred to an application (for example, SmartThings application) of the user device.

Figure 14:
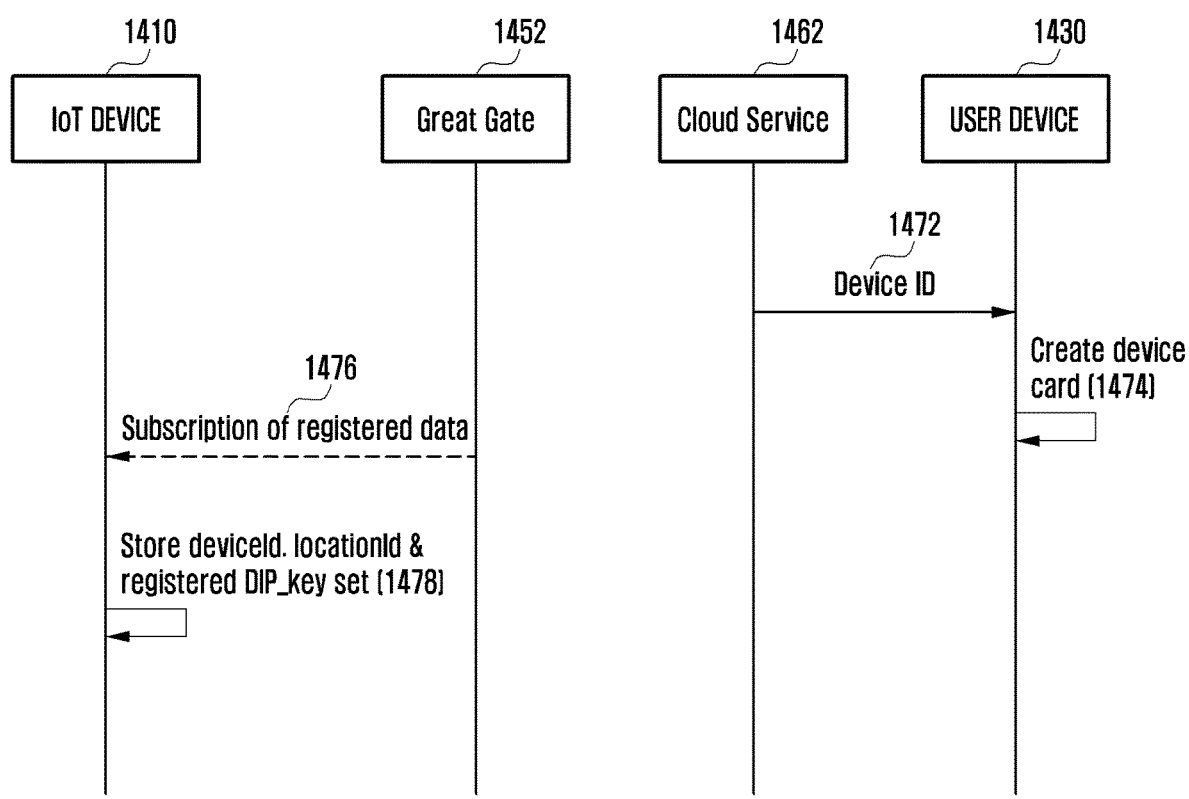
FIG. 14 is a signal flow diagram illustrating an example IoT device onboarding completion process according to various embodiments.

FIG. 14 is a signal flow diagram illustrating an example IoT device onboarding completion process according to various embodiments.

According to various embodiments, in operation 1472, a cloud service 1462 may transmit device information of an IoT device 1410 to a user device 1430. In operation 1474, the user device 1430 may generate a device card of the IoT device 1410 in an application. For example, the device card may be generated with regard to each onboarded IoT device 1410, and may include identification information of the corresponding IoT device 1410, sensing data, and/or a command, or an on/off control menu.

According to various embodiments, in operation 1476, the access gateway 1452 may transfer registered data to the IoT device 1410. For example, the access gateway 1452 may transfer a registered device ID, a location ID, and/or a DIP key set to the IoT device 1410. In operation 1478, the IoT device 1410 may store the transferred device ID, location ID, and/or DIP key set in a memory.

Figure 15:
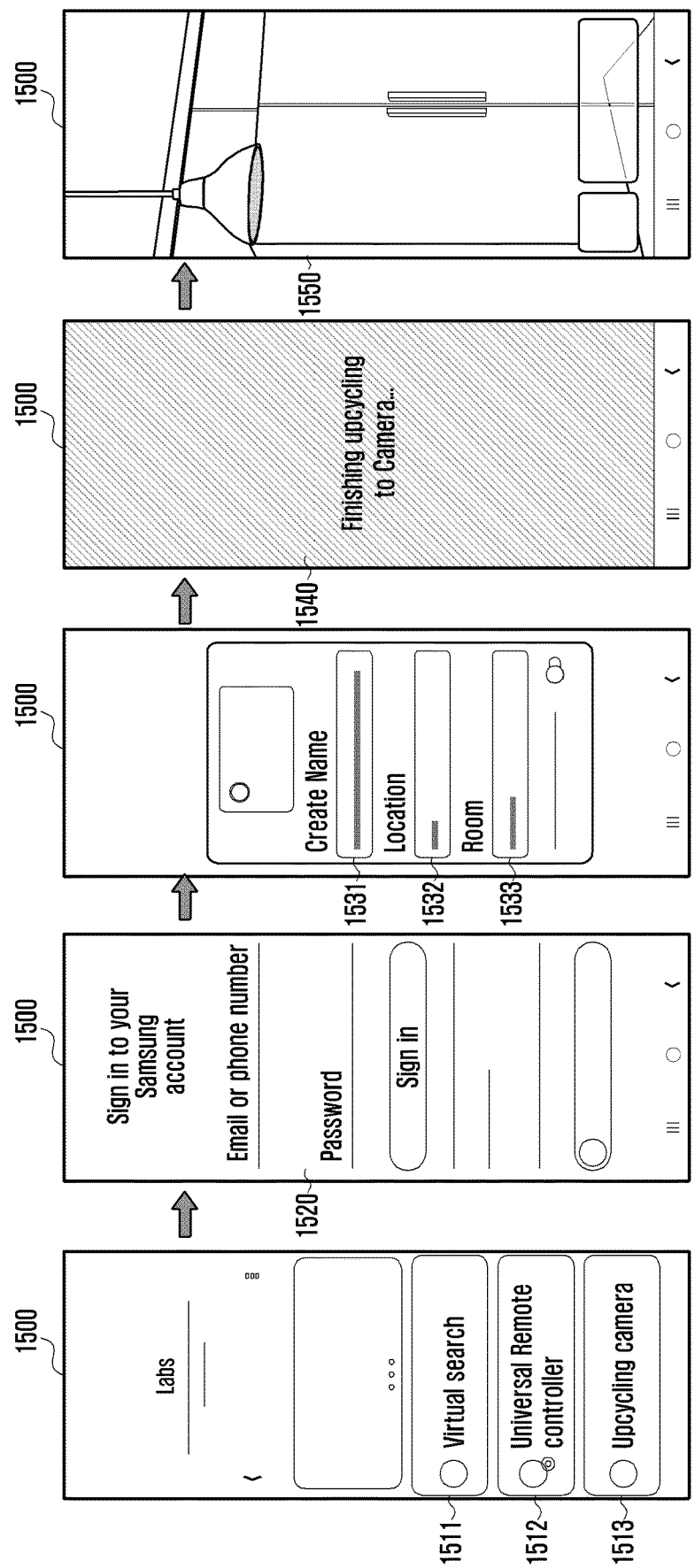
FIG. 15 is a diagram illustrating an example application screen of an IoT device according to various embodiments.

FIG. 15 is a diagram illustrating an example application screen of an IoT device according to various embodiments.

According to various embodiments, an IoT device 1500 (for example, the IoT device 400 in FIG. 4) may install and execute an application (for example, upcycling application) that supports an IoT service, thereby providing the IoT service. The IoT device 1500 may search for and download an application from an online store, and may execute the application according to the user's selection.

According to various embodiments, the application may provide a UI such that an IoT function to be executed using the IoT device 1500 can be selected. For example, the application may provide a list of functions that may be provided using a sensor of the IoT device 1500, such as a virtual search function 1511, a universal remote controller function 1512, and an upcycling camera function 1513, and may receive the user's selection. Thereafter, the application may provide a login screen 1520, and the user may log in with his/her account. The cloud network may manage device information and/or authentication information of at least one IoT device 1500 with regard to each account.

According to various embodiments, the application may provide a UI such that configuration information can be input. For example, the UI may include a menu 1531 to input the name of a corresponding IoT device 1500, a menu 1532 to input a location, and a menu 1533 to input a room. According to an embodiment, the application may receive a location information list and a room information list configured by another IoT device pre-registered by the user account from the cloud network, and may enable the user to select one from the lists.

According to various embodiments, if the user completes configuration information input, a process of onboarding into the cloud network may proceed. During the onboarding process, the IoT device 1500 may provide a predetermined loading screen 1540. The process of onboarding the IoT device 1500 has been described above with reference to FIG. 6 to FIG. 14.

According to various embodiments, after onboarding of the IoT device 1500 is completed, the IoT device 1500 may execute an IoT function selected by the user. For example, when the upcycling camera function is selected, the IoT device 1500 may capture a peripheral image 1550 with a camera and may transmit the same to the cloud network. The cloud network may transmit the image used by the IoT device 1500 to the user device of the corresponding user in real time such that the image 1550 can be identified in the user device.

Figure 16:
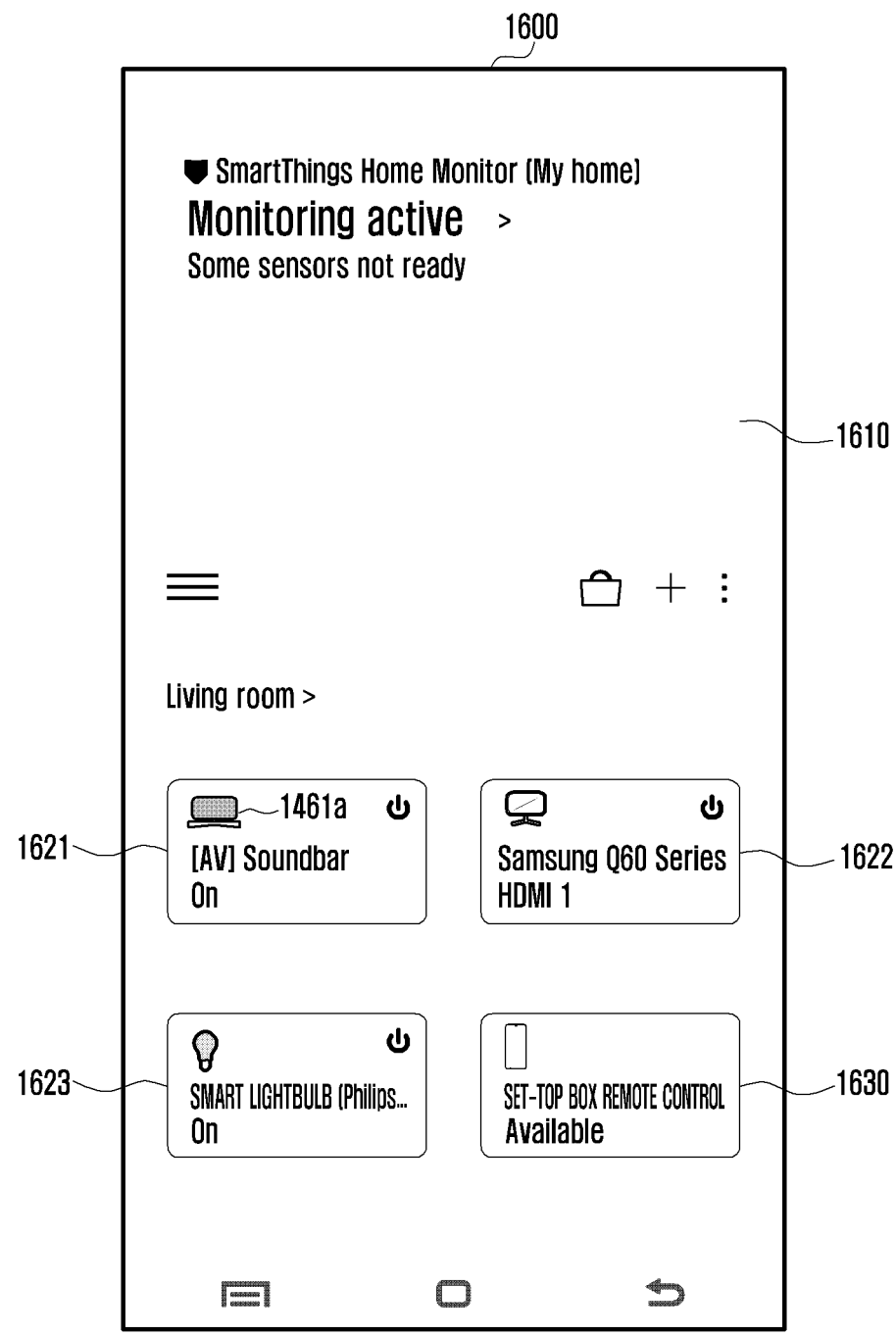
FIG. 16 is a diagram illustrating an example application screen of a user device according to various embodiments.

FIG. 16 is a diagram illustrating an example application screen of a user device according to various embodiments.

According to various embodiments, a user device (for example, the user device 130 in FIG. 1) 1600 may display UI items 1621, 1622, 1623, and 1630 corresponding to respective IoT devices (for example, the hub device 110 and the leaf device 120 in FIG. 1) of a local network. For example, the user device 1600 may display, on an application 1610, an AV soundbar UI item 1621, a TV UI item 1622, a lightbulb UI item 1623, and a set-top box remote control item 1630. Each UI item may include an image indicating a device, the name of the device, information indicting the operating state (for example, on/off, available/non-available, or open/close) of the device, and/or a button for changing the operating state of the device.

According to various embodiments, upon completing the onboarding of a new IoT device, device information of the IoT device may be transmitted from the cloud network. The application of the user device may add a UI item corresponding to the IoT device, based on received device information of the IoT device.

An electronic device (for example, electronic device 400) according to various example embodiments may include: a communication module comprising communication circuitry (for example, communication module 430), a memory (for example, memory 420), and a processor (for example, processor 410) operatively connected to the communication module and the memory. The processor 410 may be configured to: execute an application (for example, application 712 or application 812) supporting onboarding of the electronic device, acquire authentication information of the electronic device, transmit the authentication information to a cloud network through the communication module to register authentication information of the electronic device, generate configuration information of the electronic device based on an input on the application, and transmit the generated configuration information and device information of the electronic device stored in the memory to the cloud network through the communication module to request onboarding of the electronic device.

According to various example embodiments, the processor may be configured to: receive access information for onboarding of the electronic device based on the authentication information being registered in the cloud network, and access using the access information to request onboarding of the electronic device.

According to various example embodiments, the access information may include message queuing telemetry transport (MQTT) broker URL information.

According to various example embodiments, the processor may be configured to: receive the authentication information issued from a certificate issuing server using a certificate generating module, and transmit the issued authentication information to the cloud network such that the authentication information is registered.

According to various example embodiments, the processor may be configured to: log in, based on an account, through the application, to receive a token, request the cloud network to provide the authentication information based on the receive token, and receive the authentication information issued from the cloud network.

According to various example embodiments, the authentication information may include an X.509 certificate.

According to various example embodiments, the configuration information may include at least one of location information or room information.

According to various example embodiments, the processor may be configured to receive a location list and a room list from the cloud network, and select one on the location list and one on the room list, based on an input on the application.

According to various example embodiments, the device information may include at least one of a model name of the electronic device, a device name, a nation code, or language information.

According to various example embodiments, the communication module may be configured to communicate with an access point device using a short-range communication scheme, and transmit the authentication information, the configuration information, and the device information to the cloud network through the access point.

According to various example embodiments, the electronic device may further include at least one sensor (for example, sensor 450), and the processor may be configured to control the communication module to transmit sensor data acquired through the sensor to the cloud network based on onboarding of the electronic device being completed.

A method for onboarding an electronic device (for example, electronic device 400) into a server according to various example embodiments may include: executing an application (for example, application 712 or application 812) supporting onboarding of the electronic device, acquiring authentication information of the electronic device, transmitting the authentication information to a cloud network to register authentication information of the electronic device, generating configuration information of the electronic device based on an input on the application, and requesting onboarding of the electronic device by transmitting the generated configuration information and device information of the electronic device to the cloud network.

According to various example embodiments, the requesting onboarding of the electronic device may include receiving access information for onboarding of the electronic device based on the authentication information being registered in the cloud network, and making an access using the access information to request onboarding of the electronic device.

According to various example embodiments, the access information may include message queuing telemetry transport (MQTT) broker URL information.

According to various example embodiments, the acquiring authentication information may include receiving the authentication information issued from a certificate issuing server using a certificate generating module.

According to various example embodiments, the acquiring the authentication information may include logging in, based on an account, through the application to receive a token, requesting the cloud network to provide the authentication information, based on the received token, and receiving the authentication information issued from the cloud network.

According to various example embodiments, the configuration information may include at least one of location information or room information.

According to various example embodiments, the generating configuration information may include receiving a location list and a room list from the cloud network, and selecting one on the location list and one on the room list, based on an input on the application.

According to various example embodiments, the device information may include at least one of a model name of the electronic device, a device name, a nation code, or language information.

According to various example embodiments, the method may further include transmitting sensor data acquired through a sensor (for example, sensor 450) to the cloud network based on onboarding of the electronic device being completed.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
 a communication module comprising communication circuitry;
 at least one processor, comprising processing circuitry; and
 memory storing instructions that, when executed by the at least one processor, cause the electronic device to:
  execute an application supporting registration of the electronic device to a cloud network associated with a user account;
  acquire, based on the application being executed, authentication information for authenticating the electronic device from a certificate issuing server;
  transmit, based on the application being executed, the authentication information to the cloud network through the communication module to register the electronic device to the cloud network;
  receive a location list including at least one location corresponding to at least one IoT device registered to the cloud network associated with the user account from the cloud network;
  generate configuration information including location information identifying a location of the electronic device by selecting one location from the location list in the application;
  transmit the generated configuration information and device information of the electronic device to the cloud network through the communication module to register the electronic device to the cloud network;
  based on registration of the electronic device being completed, perform an IoT function of the electronic device, and transmit data acquired by the IoT function to the cloud network.

2. The electronic device of claim 1, wherein the memory stores instructions that, when executed by the at least one processor, cause the electronic device to:
 receive access information for registration of the electronic device based on the authentication information being registered in the cloud network; and
 make an access using the access information to request registration of the electronic device.

3. The electronic device of claim 2, wherein the access information comprises message queuing telemetry transport (MQTT) broker URL information.

4. The electronic device of claim 1, wherein the memory stores instructions that, when executed by the at least one processor, cause the electronic device to:
 log in, based on the user account, through the application to receive a token;
 request the cloud network to provide the authentication information, based on the received token; and
 receive the authentication information issued from the cloud network.

5. The electronic device of claim 1, wherein the authentication information comprises an X.509 certificate.

6. The electronic device of claim 1, wherein the configuration information further comprises room information of the electronic device.

7. The electronic device of claim 6, wherein the memory stores instructions that, when executed by the at least one processor, cause the electronic device to:
 receive a room list corresponding to at least one IoT device registered to the cloud network associated with the user account from the cloud network; and
 select one room on the room list based on input on the application.

8. The electronic device of claim 1, wherein the device information comprises at least one of a model name of the electronic device, a device name, a nation code, or language information.

9. The electronic device of claim 1, wherein the communication module is configured to:
 communicate with an access point using a short-range communication scheme; and
 transmit the authentication information, the configuration information, and the device information to the cloud network through the access point.

10. The electronic device of claim 1, further comprising at least one sensor,
 wherein the data acquired by the IoT function comprises sensor data acquired through the sensor.

11. A method for registering an electronic device to a cloud network, the method comprising:
 executing an application supporting registration of the electronic device to the cloud network associated with a user account;
 acquiring, based on the application being executed, authentication information for authenticating the electronic device from a certificate issuing server;
 transmitting, based on the application being executed, the authentication information to the cloud network to register the electronic device to the cloud network;
 receiving a location list including at least one location corresponding to at least one IoT device registered to the cloud network associated with the user account from the cloud network;
 generating configuration information including location information identifying a location of the electronic device by selecting one location from the location list in the application;
 transmitting the generated configuration information and device information of the electronic device to the cloud network to register the electronic device to the cloud network;
 based on registration of the electronic device being completed, performing an IoT function of the electronic device, and transmitting data acquired by the IoT function to the cloud network.

12. The method of claim 11, comprising:
 receiving access information for registration of the electronic device based on the authentication information being registered in the cloud network; and
 making an access using the access information to request registration of the electronic device.

13. The method of claim 12, wherein the access information comprises message queuing telemetry transport (MQTT) broker URL information.

14. The method of claim 11, wherein acquiring the authentication information comprises:
 receiving a token by logging into the application based on the user account;
 requesting the cloud network to provide the authentication information, based on the received token; and
 receiving the authentication information issued from the cloud network.

15. The method of claim 11, wherein the configuration information further comprises room information of the electronic device.

16. The method of claim 15, wherein generating the configuration information comprises:
- receiving a room list corresponding to at least one IoT device registered to the cloud network associated with the user account from the cloud network; and
- selecting one room on the room list based on input on the application.

17. The method of claim 11, wherein the device information comprises at least one of a model name of the electronic device, a device name, a nation code, or language information.

18. The method of claim 11, wherein the data acquired by the IoT function comprises sensor data acquired through a sensor of the electronic device.

* * * * *